US007509386B2

(12) United States Patent
Miyashita

(10) Patent No.: US 7,509,386 B2
(45) Date of Patent: Mar. 24, 2009

(54) CHAT SYSTEM DISPLAYING A LINK ARROW DIRECTED FROM A HYPERLINK TO CONTENT OF AN ASSOCIATED ATTACHMENT FILE

(75) Inventor: Ken Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 800 days.

(21) Appl. No.: 10/314,226

(22) Filed: Dec. 9, 2002

(65) Prior Publication Data

US 2003/0131062 A1       Jul. 10, 2003

(30) Foreign Application Priority Data

Dec. 11, 2001    (JP)    ............................. 2001-376946

(51) Int. Cl.
*G06F 15/16* (2006.01)

(52) U.S. Cl. ...................... 709/207; 709/206

(58) Field of Classification Search ................ 709/206, 709/200, 232, 207, 203; 345/752; 705/14; 707/103 R, 10
See application file for complete search history.

(56) References Cited

U.S. PATENT DOCUMENTS

| | | | | |
|---|---|---|---|---|
| 5,771,355 A | * | 6/1998 | Kuzma | ........................ 709/232 |
| 5,781,901 A | * | 7/1998 | Kuzma | ........................ 707/10 |
| 5,794,039 A | * | 8/1998 | Guck | ...................... 707/103 R |
| 5,903,723 A | * | 5/1999 | Beck et al. | ................... 709/200 |
| 6,009,462 A | * | 12/1999 | Birrell et al. | ................. 709/206 |
| 6,275,848 B1 | * | 8/2001 | Arnold | ........................ 709/206 |
| 6,687,741 B1 | * | 2/2004 | Ramaley et al. | .............. 709/206 |
| 6,785,712 B1 | * | 8/2004 | Hogan et al. | ................. 709/206 |
| 2002/0105545 A1 | * | 8/2002 | Carter et al. | ................. 345/752 |
| 2002/0169826 A1 | * | 11/2002 | Yano et al. | ................... 709/203 |
| 2002/0174010 A1 | * | 11/2002 | Rice, III | ....................... 705/14 |
| 2002/0198944 A1 | * | 12/2002 | Moss | .......................... 709/206 |
| 2003/0208543 A1 | * | 11/2003 | Enete et al. | .................. 709/206 |

FOREIGN PATENT DOCUMENTS

JP       2000-200224       7/2000

OTHER PUBLICATIONS

Patent Abstracts of Japan, JP 10-040188, Feb. 13, 1998.
Patent Abstracts of Japan, JP 2001-306423, Nov. 2, 2001.
Patent Abstracts of Japan, JP 09-244856, Sep. 19, 1997.
Patent Abstracts of Japan, JP 2000-322343, Nov. 24, 2000.

* cited by examiner

*Primary Examiner*—Le Luu
(74) *Attorney, Agent, or Firm*—Oblon, Spivak, McClelland, Maier & Neustadt, P.C.

(57) ABSTRACT

A body of a received e-mail is displayed in a text display field. The body displayed in the text input field includes a link indication. When a user clicks on the link indication by the mouse, a client computer displays an attachment file displaying window on a monitor and the content of an attachment file in the attachment file displaying window. Also, the client computer displays on the monitor a link arrow directed from the link indication to the attachment file displaying window.

11 Claims, 31 Drawing Sheets

FIG. 19A

```
>From bin  Thu Oct 25 22:07:14 2001
Date: Thu, 25 Oct 2001 22:05:35 +0900
From: whoami@foo.com
To: whoareyou@goo.com
Subject: link test mail
Message-Id: <20011025220105.ADB5.whoami@foo.com>
MIME-Version: 1.0
Content-Type: multipart/mixed; boundary="----_3BD80E1FADC401B6C2F8_MULTIPART_MIXED_"
Content-Transfer-Encoding: 7bit
X-Mailer: Becky! ver. 2.00.01
X-UIDL: 12f32f282c2e5cc30c452149bb59d784
```
— 421

------_3BD80E1FADC401B6C2F8_MULTIPART_MIXED_
Content-Type: multipart/alternative; boundary="------_3BD80E1FADC501B6C2F8_MULTIPART_ALTERNATIVE_
Content-Transfer-Encoding: 7bit

```
------_3BD80E1FADC501B6C2F8_MULTIPART_ALTERNATIVE_
Content-Type: text/plain; charset="ISO-2022-JP"
Content-Transfer-Encoding: 7bit This is a link to abc.jpg.
```
— 422

```
------_3BD80E1FADC501B6C2F8_MULTIPART_ALTERNATIVE_
Content-Type: text/html; charset="ISO-2022-JP"
Content-Transfer-Encoding: 7bit <!DOCTYPE HTML PUBLIC "-//W3C//DTD HTML 4.0 Transitional//EN">
<HTML><HEAD>
<META content="text/html; charset=ISO-2022-JP" http-equiv=Content-Type>
<META content="MSHTML 5.00.3103.1000" name=GENERATOR></HEAD>
<BODY> This is a link to <A href="abc.jpg">abc.jpg</A>        — 425
</BODY></HTML>
```
— 423

```
------_3BD80E1FADC501B6C2F8_MULTIPART_ALTERNATIVE_--

------_3BD80E1FADC401B6C2F8_MULTIPART_MIXED_
Content-Type: application/octet-stream; name="abc.jpg"
Content-Disposition: attachment;
  filename="abc.jpg"
Content-Transfer-Encoding: base64 dm9pZCBmb28oKQ0KewOKICAgIGlmKCI7DQogICAgICAgIA==

------_3BD80E1FADC401B6C2F8_MULTIPART_MIXED_--
```
— 424

FIG. 19B

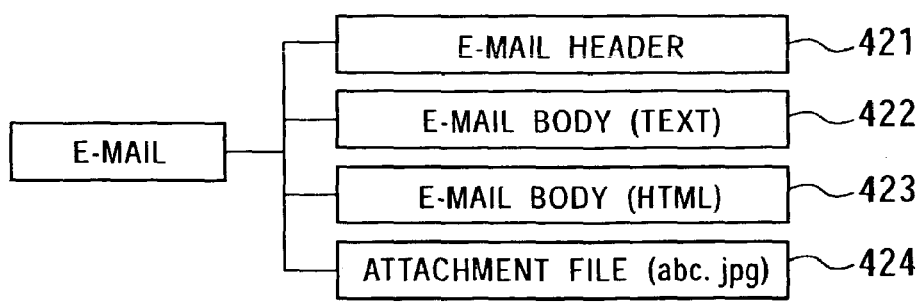

CHAT SYSTEM DISPLAYING A LINK ARROW DIRECTED FROM A HYPERLINK TO CONTENT OF AN ASSOCIATED ATTACHMENT FILE

BACKGROUND OF THE INVENTION

1. Field of the Invention

The present invention relates to service providing systems, information providing apparatuses and methods, information processing apparatuses and methods, and programs. More specifically, the present invention relates to a service providing system, an information providing apparatus and method, an information processing apparatus and method, and a program that serve to clearly display an association between, for example, a file attached to an e-mail and a body of the e-mail.

2. Description of the Related Art

As is known, it is possible to send an electronic mail to a desired e-mail address with a file (including a binary file) attached to the e-mail. This allows sending of information other than text, such as image data.

For example, Japanese Unexamined Patent Application Publication No. 2001-265753 discloses a method of attaching a comment to a text in which an indication of a link to a multimedia document is attached to an e-mail to be sent. According to the publication, a computer of a sender of an e-mail attaches a URL (uniform resource locator) of a multimedia document to be linked to the e-mail, and a computer that has received the e-mail displays the URL together with a body of the e-mail, and if a user specifies the URL, it displays information associated with the URL.

If a link to a URL of an associated multimedia document is attached or a file is attached to an e-mail as described above, a receiver of the e-mail predicts the content of the multimedia document or the attached file based on the content of a body of the e-mail.

However, if a plurality of files or a plurality of URLs is attached to a received e-mail, a receiver of the e-mail is not allowed to readily grasp which of the plurality of attached files (or URLs) is associated with the content of the body.

SUMMARY OF THE INVENTION

The present invention has been made in view of the above, and it is an object of the present invention to allow an association between, for example, a file attached to an e-mail and a body of the e-mail to be clearly displayed.

The present invention, in one aspect thereof, provides a service providing system including an information providing apparatus for sending first information and second information to an information processing apparatus, the second information being attached to the first information and different from the first information; and the information processing apparatus for presenting the first information and the second information received from the information providing apparatus; wherein the information providing apparatus includes a sending unit for sending the first information, including a link to the second information, and the second information to the information processing apparatus, and the information processing apparatus includes a receiving unit for receiving the first information and the second information from the information providing apparatus; and a presenting unit for presenting the first information received by the receiving unit, and for presenting the second information if the link included in the first information presented is operated.

The present invention, in another aspect thereof, provides an information providing apparatus for sending first information and second information to an information processing apparatus, the second information being attached to the first information and different from the first information, the information providing apparatus including a sending unit for sending the first information, including a link to the second information, and the second information to the information processing apparatus.

The information providing apparatus may further include a receiving unit for receiving the first information and the second information from the information processing apparatus, wherein the sending unit sends the first information and the second information received by the receiving unit to another information processing apparatus.

The information providing apparatus may further include a storage unit for storing the first information and the second information received by the receiving unit, wherein the sending unit sends the first information and the second information stored by the storage unit to another information processing apparatus.

The present invention, in another aspect thereof, provides an information providing method of an information providing apparatus for sending first information and second information to an information processing apparatus, the second information being attached to the first information and different from the first information, the information providing method including a sending step of sending the first information, including a link to the second information, and the second information to the information processing apparatus.

The present invention, in another aspect thereof, provides a program for allowing a computer that controls an information providing apparatus for sending first information and second information to an information processing apparatus, the second information being attached to the first information and different from the first information, to execute a sending step of sending the first information, including a link to the second information, and the second information to the information processing apparatus.

The present invention, in another aspect thereof, provides an information processing apparatus for presenting first information and second information received from an information providing apparatus, the second information being attached to the first information and different from the first information, the information processing apparatus including a receiving unit for receiving the first information, including a link to the second information, and the second information from the information providing apparatus; and a presenting unit for presenting the first information received by the receiving unit, and for presenting the second information if the link included in the first information presented is operated.

The presenting unit may display an arrow directed from the link to the second information when presenting the second information if the link is operated.

The information processing apparatus may further include a first accepting unit for accepting creation of the first information and the second information; and a sending unit for sending the first information and the second information, creation of which has been accepted by the first accepting unit, to the information providing apparatus.

The first information may include a text.

For example, the first accepting unit displays an area for accepting input of the text, and creates the link associated with the second information at an end of the text being input to the area if an icon of the second information is dragged and dropped to the area displayed.

The information processing apparatus may further include a second accepting unit for accepting an instruction for attaching one or more sets of the second information, wherein the first accepting unit creates, in response a predetermined operation by a user, the link to the second information, the instruction for attachment thereof having been accepted by the second accepting unit, at an end of the text being input to the area.

The present invention, in another aspect thereof, provides an information processing method of an information processing apparatus for presenting first information and second information received from an information providing apparatus, the second information being attached to the first information and different from the first information, the information processing method including a receiving step of receiving the first information, including a link to the second information, and the second information from the information providing apparatus; and a presenting step of presenting the first information received in the receiving step, and presenting the second information if the link included in the first information presented is operated.

The present invention, in another aspect thereof, provides a program for allowing a computer that controls an information processing apparatus for presenting first information and second information received from an information providing apparatus, the second information being attached to the first information and different from the first information, to execute a receiving step of receiving the first information, including a link to the second information, and the second information from the information providing apparatus; and a presenting step of presenting the first information received in the receiving step, and presenting the second information if the link included in the first information presented is operated.

According to a service providing system of the present invention, an information providing apparatus sends first information, including a link to second information, and the second information to an information processing apparatus, and the information processing apparatus receives the first information and the second information from the information providing apparatus, presents the first information received, and presents the second information if the link included in the first information presented is operated. Accordingly, an association between, for example, a file attached to an e-mail and a body of the e-mail can be clearly presented.

According to an information providing apparatus of the present invention, first information, including a link to second information, and the second information are sent to an information processing apparatus. Accordingly, an association between, for example, a file attached to an e-mail and a body of the e-mail can be clearly presented at the information processing apparatus.

According to an information processing apparatus of the present invention, first information, including a link to second information, and the second information are received from an information providing apparatus, the first information received is presented, and the second information is presented if the link included in the first information presented is operated. Accordingly, an association between, for example, a file attached to an e-mail and a body of the e-mail can be clearly presented.

BRIEF DESCRIPTION OF THE DRAWINGS

FIGS. 19A and 19B are diagrams for explaining the structure of data of an e-mail to be sent;

DESCRIPTION OF THE PREFERRED EMBODIMENTS

Figure 1:
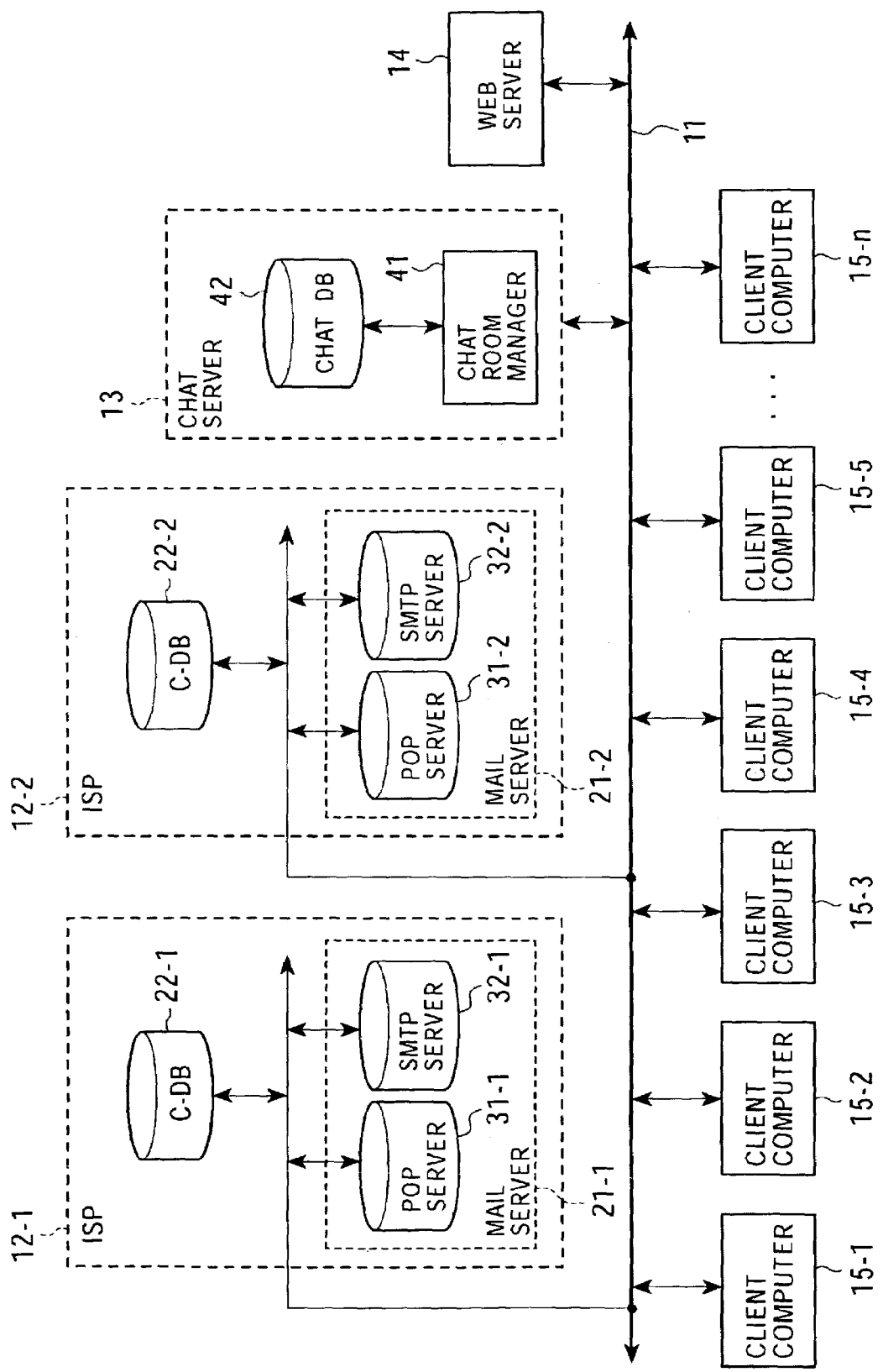
FIG. 1 is a diagram showing the configuration of a service providing system according to an embodiment of the present invention.

FIG. 1 shows an example configuration of a service providing system according to an embodiment of the present invention. In the service providing system, Internet service providers (ISPs) 12-1 and 12-2, a chat server 13, a Web server 14, and client computers 15-1 to 15-n are connected to a network 11.

The Internet service provider 12-1 has a mail server 21-1 and a customer database 22-1. The mail server 21-1 includes a POP (Post Office Protocol) server 31-1 and an SMTP (Simple Mail Transfer Protocol) server 32-1.

In the customer database 22-1, various information of users of the Internet service provider 12-1 is registered. The POP server 31-1 is mainly responsible for processing e-mails received from other Internet service providers. The SMTP server 32-1 is mainly responsible for exchanging e-mails with mail servers of other Internet service providers.

The Internet service provider 12-2 has a customer database 22-2, and a mail server 21-2 including a POP server 31-2 and an SMTP server 32-2. The basic configuration is the same as that of the Internet service provider 12-1.

Although not shown, actually, a plurality of Internet service providers, in addition to the Internet service providers 12-1 and 12-2, is connected to the network 11. In the following description, the Internet service provider 12-1 and the Internet service provider 12-2 will each be simply referred to as an Internet service provider 12 except where distinction therebetween is necessary.

Also, the mail server 21-1 and the mail server 21-2 will each be simply referred to as a mail server 21 except where distinction therebetween is necessary. Also, the customer database 22-1 and 22-2 will each be simply referred to as a customer database 22 except where distinction therebetween is necessary. Also, the POP server 31-1 and the POP server 31-2 will each be simply referred to as a POP server 31 except where distinction therebetween is necessary. Also, the SMTP server 32-1 and the SMTP server 32-2 will each be simply referred to as an SMTP server 32 except where distinction therebetween is necessary.

The chat server 13 is implemented, for example, by a workstation, a personal computer, or the like, and it functions as a chat server by executing a chat server program.

More specifically, the chat server 13 stores text data (hereinafter referred to as chat text) input by a given group among the client computers 15-1 to 15-n as chat log data in a chat database 42 in order of input time. Furthermore, the chat server 13 stores files attached by the group of the client computers 15-1 to 15-n in the chat database 42 so that the files will be shared among the client computers.

The chat server 13 supplies the chat log data and the attachment files stored in the chat database 42 to the group of client computers participating in a chat in the same chat room. The chat database 42 is managed by a chat room manager 41. The chat server 13 thus provides a chatting environment for chatting among a given group among the client computers 15-1 to 15-n.

Although not shown, actually, a plurality of chat servers, in addition to the chat server 13, is connected to the network 11.

The Web server 14 provides various information, such as Web pages, via the network 11 in response to requests from the client computers 15-1 to 15-n. Although not shown, actually, a plurality of Web servers, in addition to the Web server 14, is connected to the network 11.

The client computers 15-1 to 15-n (the client computers 15-1 to 15-n will each be simply referred to as a client computer 15 except where distinction thereamong is necessary) store mailing software for exchanging e-mails with other client computers 15. The client computer 15 establishes a connection with an Internet service provider 12 to which it subscribes, and exchanges e-mails (including attachment files) with other client computers 15.

Furthermore, the client computer 15 stores a chat client program for chatting with other client computers 15 in a chat space provided by the chat server 13. By execution of the chat client program at the client computer 15 and execution of the chat server program at the chat server 13, a chat space is displayed on the client computer 15.

Figure 2:
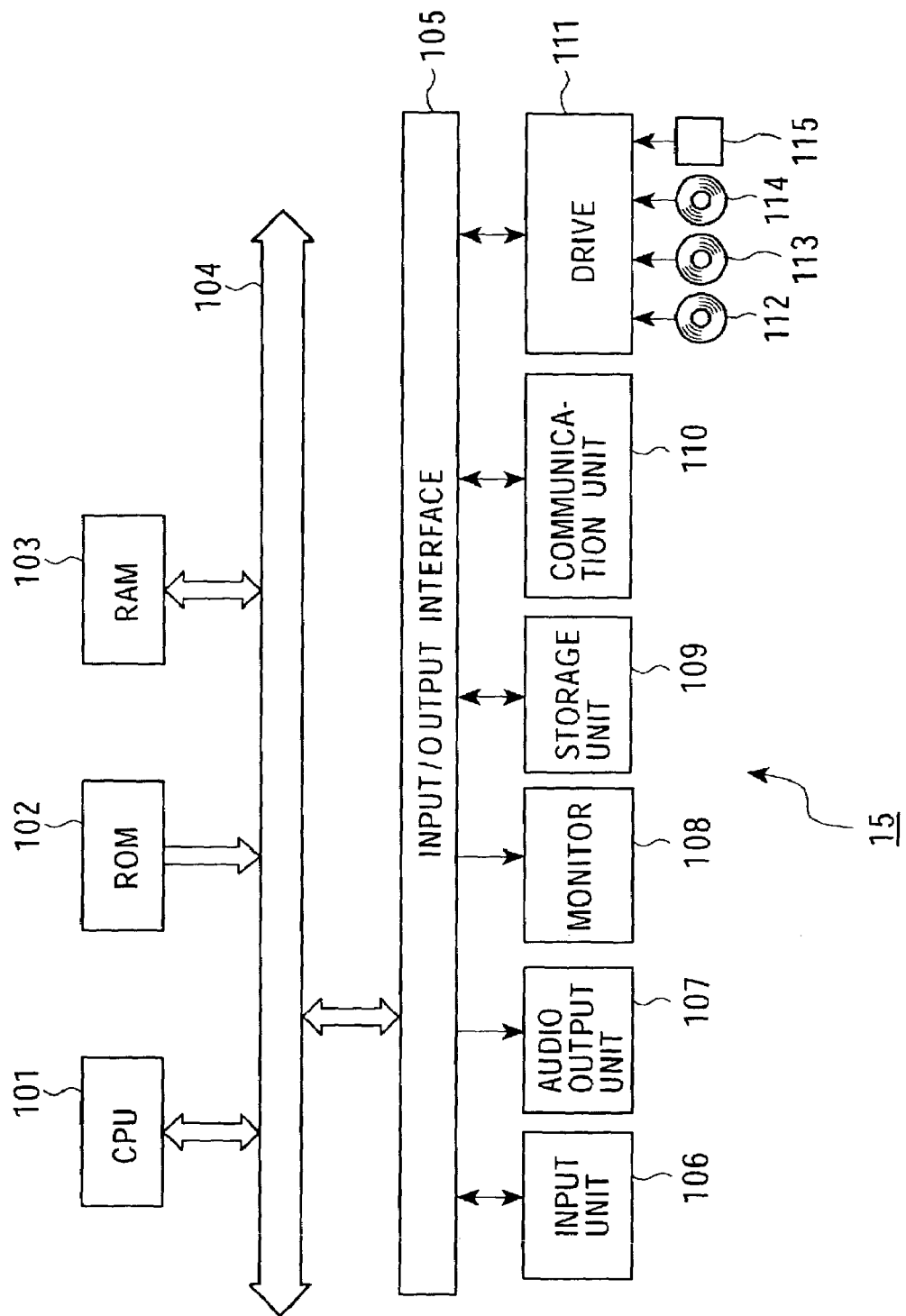
FIG. 2 is a block diagram showing the configuration of a client computer shown in FIG. 1.

FIG. 2 shows an example configuration of the client computer 15. The client computer 15 is, for example, a general-purpose personal computer, and it has a function of accessing the network 11. Referring to FIG. 2, a CPU 101 executes various processes according to programs stored in a ROM 102 or programs loaded from a storage unit 109 into a RAM 103. The RAM 103 also stores, as needed, data required for execution of the various processes by the CPU 101.

The CPU 101, the ROM 102, and the RAM 103 are connected to each other via a bus 104. Also, an input/output interface 105 is connected to the bus 104.

The input/output interface 105 is connected to an input unit 106 including, for example, a keyboard and a mouse, an audio output unit 107 such as a speaker, a monitor 108 such as a cathode ray tube (CRT) display or a liquid crystal display (LCD), a storage unit 109 such as a hard disk, and a communication unit 110 such as a modem or a terminal adaptor.

The input unit 106 is operated by a user when, for example, various instructions to the CPU 101 are input. The audio output unit 107 plays audio data under the control of the CPU 101. The monitor 108 displays information under the control of the CPU 101. The storage unit 109 stores, for example, an operating system and programs supplied to the client computer 15.

The communication unit 110 executes communications via the network 11.

The input/output interface 105 is also connected to a drive 111 as required, on which a magnetic disk 112, an optical disk 113, a magneto-optical disk 114, a semiconductor memory 115, or the like is mounted as required, and a computer program is read therefrom and installed in the storage unit 109 as required.

Figure 3:
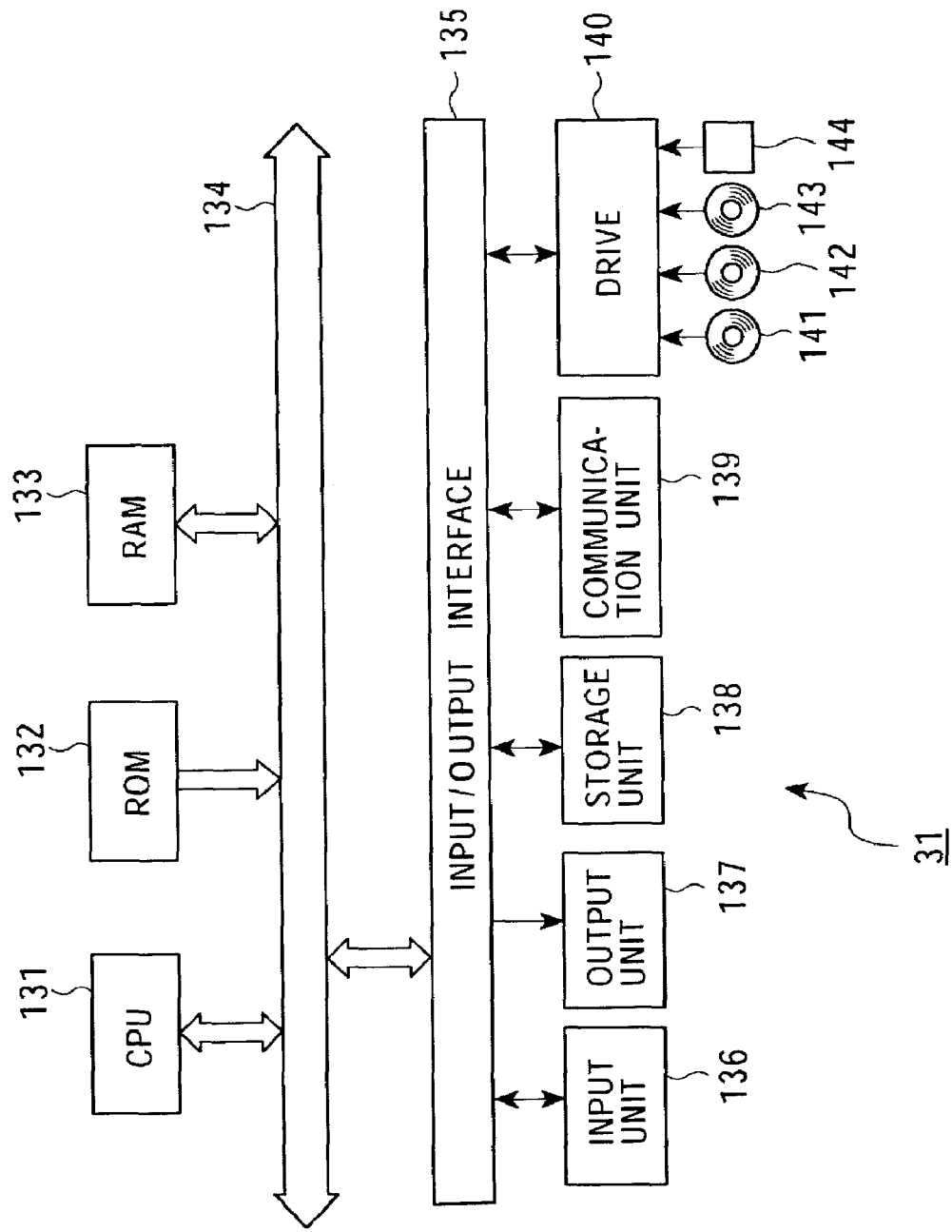
FIG. 3 is a block diagram showing the configuration of a POP server shown in FIG. 1.

FIG. 3 shows an example configuration of the POP server 31. A CPU 131 to an input unit 136 and a storage unit 138 to a semiconductor memory 144 of the POP server 31 are configured basically the same as the CPU 101 to the input unit 106 and the storage unit 109 to the semiconductor memory 115 of the client computer shown in FIG. 2, and corresponding components have the corresponding functions. Thus, repeated descriptions thereof will be refrained.

An output unit 137 includes, for example, a monitor such as a CRT display or an LCD, and a speaker or the like.

Figure 4:
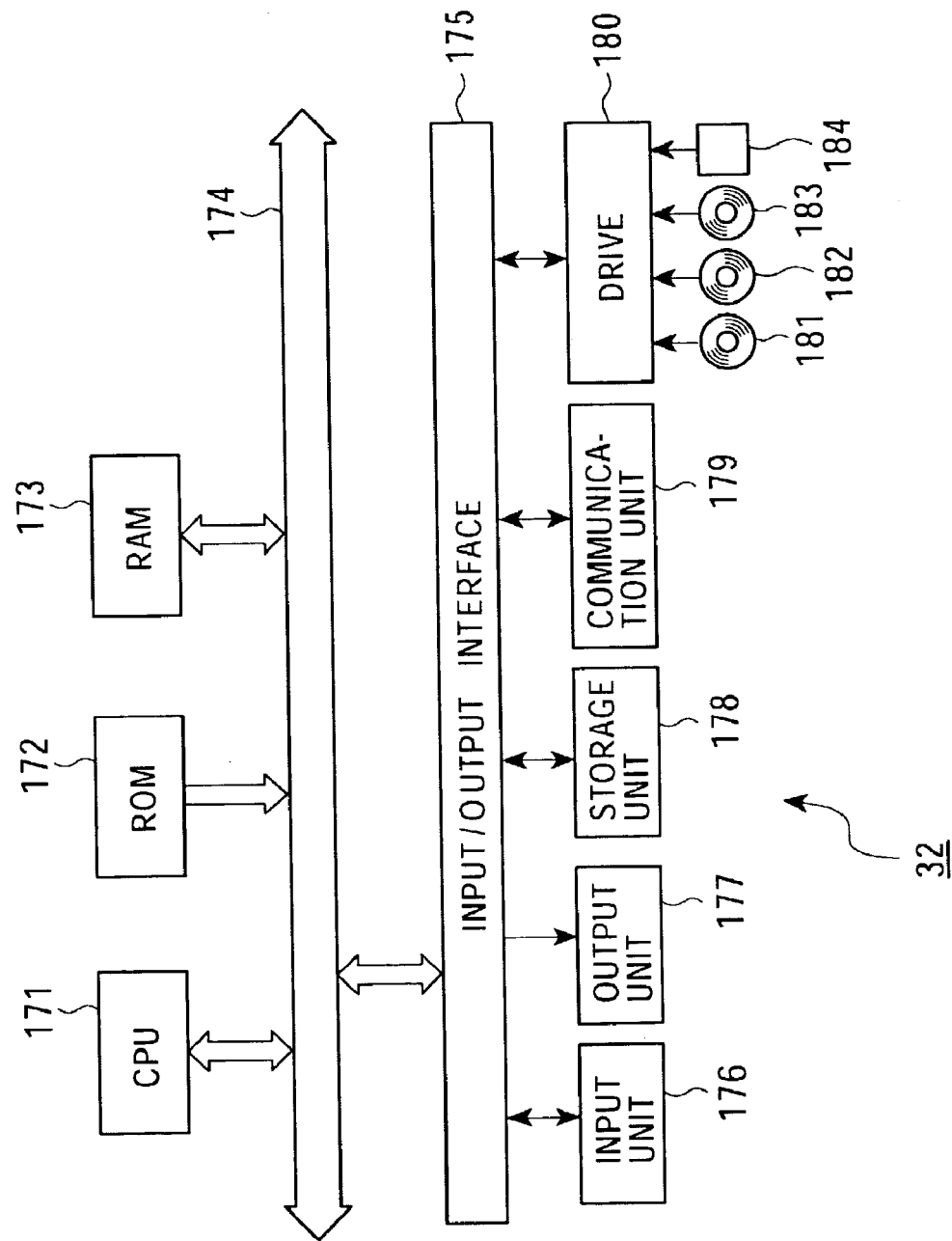
FIG. 4 is a block diagram showing the configuration of an SMTP server shown in FIG. 1.

FIG. 4 shows an example configuration of the SMTP server 32. A CPU 171 to a semiconductor memory 184 of the SMTP server 32 are configured basically the same as the CPU 131 to the semiconductor memory 144 of the POP server 31 shown in FIG. 3, and corresponding components have the corresponding functions. Thus, repeated descriptions thereof will be refrained.

Figure 5:
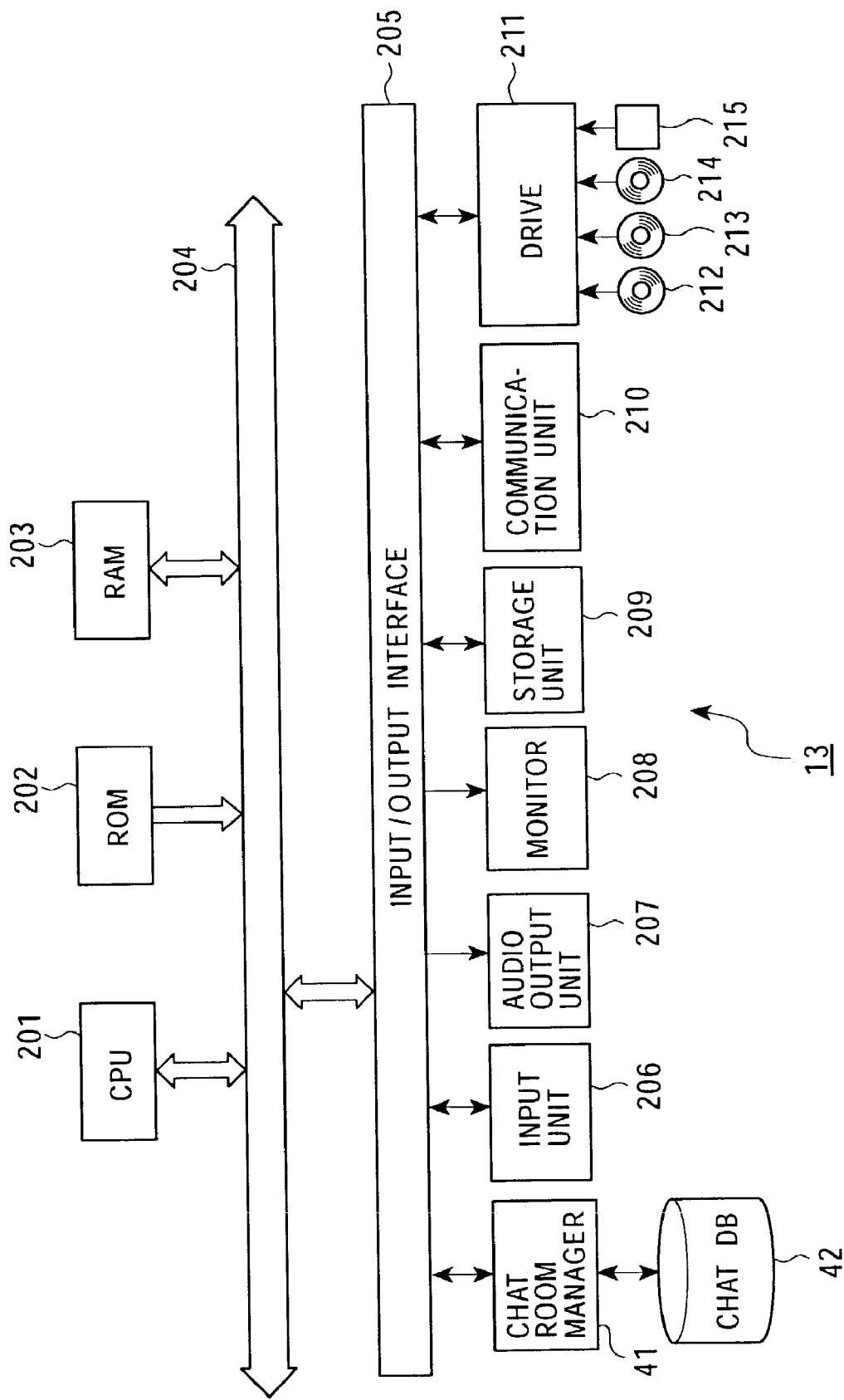
FIG. 5 is a block diagram showing the configuration of a chat server shown in FIG. 1.

FIG. 5 shows an example configuration of the chat server 13. A CPU 201 to an input/output interface 205 and an input unit 206 to a semiconductor memory 215 of the chat server 13 are configured basically the same as the CPU 101 to the semiconductor memory 115 of the client computer shown in FIG. 2, and corresponding components have the corresponding functions. Thus, repeated descriptions thereof will be refrained. In addition, in the chat server 13, the chat room manager 41 is connected to the input/output interface 205 and to the chat database 42.

The chat room manager 41, upon receiving an instruction for creating a new chat room from the client computer 15, creates an area in the chat database 42 for managing data exchanged in the new chat room. A chat room ID for identifying the chat room is assigned to the area.

Furthermore, in the area created for the new chat room, an area for managing chat log data and an area for managing attachment files are created, and chat log data and attachment files area subsequently managed in the respective areas.

In the following description, the area for managing chat log data will be referred to as a chat log data management area, and the area for managing attachment files will be referred to as an attachment file management area.

The chat room manager 41, upon receiving a chat text from a client computer 15 participating in a chat, searches for a corresponding chat room in the chat database 42 based on a chat room ID that has been sent along with the chat text. The chat room manager 41 then stores the received chat text as chat log data in the chat log data management area in the chat room.

If chat log data has already been stored in the chat log data management area, the chat room manager 41 adds the received chat text to the chat log data that has been stored to update the chat log data.

If attachment file information (information indicating the presence of an attachment file) is included in the chat text received from the client computer 15, the chat room manager 41 stores the chat text including the attachment file information in the chat log data management area, and stores an attachment file received together with the chat text in the attachment file management area.

The chat room manager 41, after storing the received chat text in the chat database 42 as chat log data, sends the chat log data stored in the chat database 42 to all the client computers 15 participating in a chat in the same chat room (i.e., the client computers 15 sharing the same chat space) via the communication unit 210.

The chat log data that is actually sent, however, is only a portion of the chat log data associated with the received chat text. Furthermore, if a file is attached to the received chat text, the chat room manager 41 also sends the attachment file together with the chat log data from the communication unit 210.

The chat room manager 41 is aware of the identities of individual members that have logged on to the chat room. When a new user logs on to or when a user logs off an existing chat, the chat room manager 41 updates information regarding members that are currently logged on to the chat room (hereinafter referred to as log-on user information), and sends the updated log-on user information to all the client computers that are currently logged on to the chat room.

Next, processing for exchanging an e-mail will be described with reference to FIG. 6. In the following description, a user that operates the client computer 15-1 will be referred to as a user A, a user that operates the client computer 15-2 will be referred to as a user B, a user that operates the client computer 15-3 will be referred to as a user C, a user that operates the client computer 15-4 will be referred to as a user D, and a user that operates the client computer 15-5 will be referred to as a user E.

It is assumed herein that the user A subscribes to the Internet service provider 12-1, and that the user B subscribes to the Internet service provider 12-2.

Now, processing for exchanging an e-mail will be described in the context of an example where the user A sends an e-mail to the user B.

In step S11, the client computer 15-1 accepts creation of an e-mail by the user A via the input unit 106. The user A creates an e-mail to be sent to the client computer 15-2 of the user B. At this time, the CPU 101 of the client computer 15-1 accepts attachment of a file together with text data of the e-mail. The processing for creating an e-mail will be described later in detail.

When the CPU 101 of the client computer 15-1 determines that an instruction for sending an e-mail has been input by the user A via the input unit 106, the procedure proceeds to step S12. In step S12, the CPU 101 of the client computer 15-1 sends the e-mail created in step S11 from the communication unit 110 to the mail server 21-1 of the Internet service provider 12-1 via the network 11.

In step S21, the SMTP server 32-1 of the mail server 21-1 receives the e-mail sent from the client computer 15-1 in step S12 via the communication unit 179.

In step S22, the CPU 171 of the SMTP server 32-1 reads an e-mail address of a destination included in the e-mail received in step S21, and sends the e-mail from the client computer 15-1 to the POP server 31-2 of the Internet service provider 12-2 associated with the e-mail address.

In step S31, the POP server 31-2 of the mail server 21-2 receives the e-mail from the client computer 15-1, sent by the SMTP server 32-1 in step S22, via the communication unit 139.

In step S32, the CPU 131 of the POP server 31-2 stores the e-mail received in step S31 in the storage unit 138, and holds the e-mail until an access is made by the client computer 15-2.

When the client computer 15-2 determines in step S41 that an instruction for checking received e-mails has been input by the user B via the input unit 106, the procedure proceeds to step S42. In step S42, the CPU 101 of the client computer 15-2 issues an inquiry to the POP server 31-2 via the communication unit 110 for e-mails addressed to the client computer 15-2.

In step S33, the communication unit 139 of the POP server 31-2 receives the inquiry from the client computer 15-2. In step S34, the CPU 131 of the POP server 31-2 searches e-mails stored in the storage unit 138 for e-mails addressed to the e-mail address of the client computer 15-2 that has issued the inquiry.

In this example, the e-mail stored in the storage unit 138 in step S35, which is addressed to the client computer 15-2, is detected.

In step S35, the CPU 131 of the POP server 31-2 sends the e-mail addressed to the client computer 15-2, found in step S34, to the client computer 15-2 via the communication unit 139.

In step S43, the communication unit 110 of the client computer 15-2 receives the e-mail sent by the POP server 31-2 in step S35. In step S44, the CPU 101 of the client computer 15-2 displays the e-mail received in step S43 on the monitor 108. The display of the received e-mail will be described later in detail.

In this manner, the e-mail (including an attachment file) created by the user A at the client computer 15-1 is delivered to the client computer 15-2 via the mail server 21-1 and the mail server 21-2, and then displayed on the monitor 108 of the client computer 15-2.

Next, the processing in step S11 in FIG. 6, i.e., the processing for creating an e-mail at the client computer 15-1, will be described in detail with reference to a flowchart shown in FIG. 7.

In step S61, the CPU 101 of the client computer 15-1 waits until an instruction for creating a new e-mail is input. When an instruction for creating a new e-mail is input, the procedure proceeds to step S62, in which the CPU 101 of the client computer 15-1 displays a window for creating a new e-mail on the monitor 108.

Figure 8:
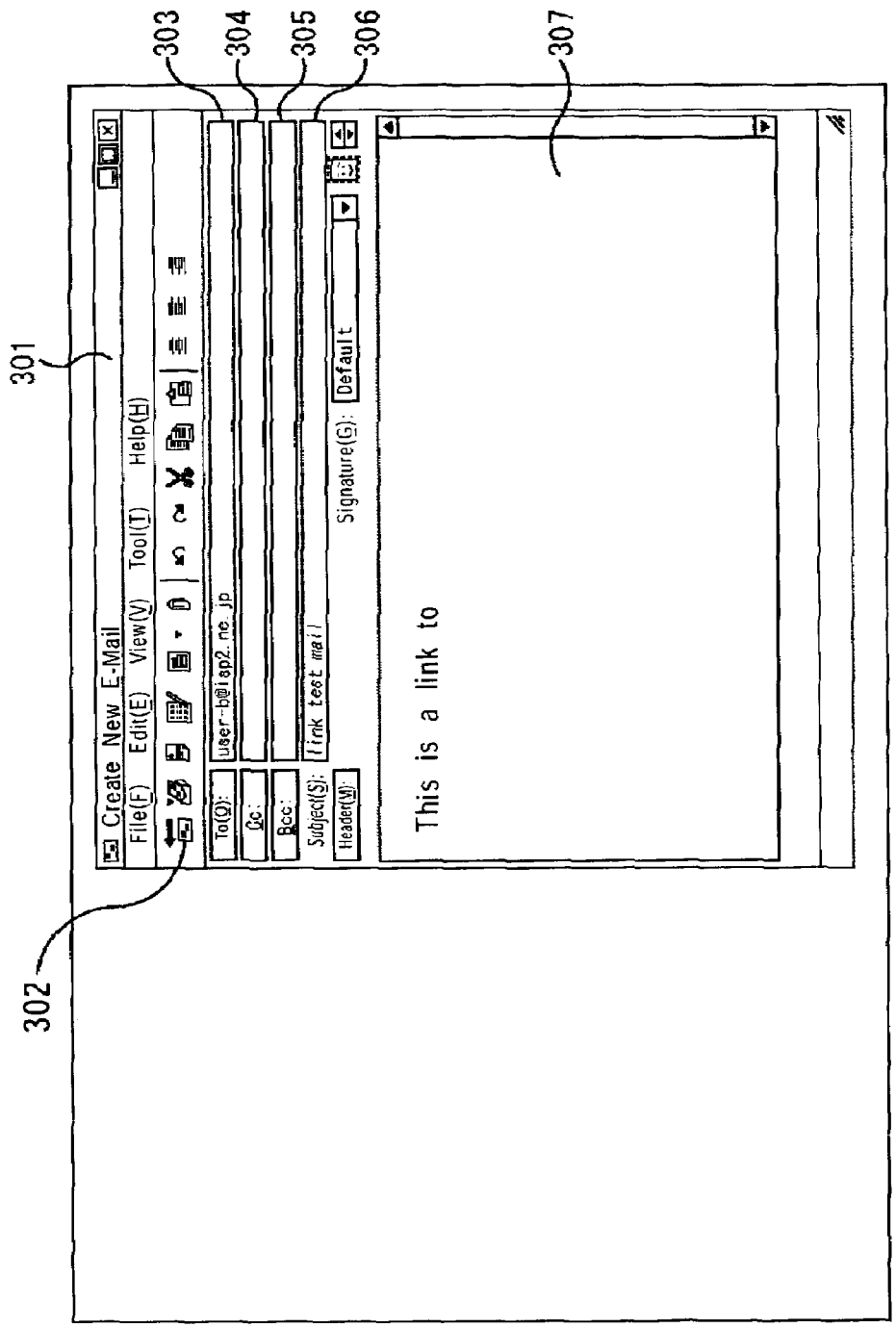
FIG. 8 is an illustration of an example of a screen displayed on a monitor of the client computer in step S62 in FIG. 7.

FIG. 8 shows an example of a screen displayed on the monitor 108 of the client computer 15-1 in step S62. In FIG. 8, an e-mail creating window 301 is displayed on the right side of the screen.

Referring to FIG. 8, the e-mail creating window 301 includes a send key 302 that is clicked on to send an e-mail that has been created; an address input field 303 for accepting input of an e-mail address of a destination of the e-mail; a CC (carbon copy) input field for accepting input of an e-mail address of a party to which the e-mail is to be also sent, if any; a BCC (blind carbon copy) input field 304 for accepting input of an e-mail address of a party to which the e-mail is to be also sent (in this case, however, recipients of the e-mail are not allowed to identify a client computer 15 associated with the party designated in this field), if any; a subject input field 306 for accepting input of a title of the e-mail; and a text input field 307 for accepting input of a body of the e-mail.

In step S63, the CPU 101 of the client computer 15-1 accepts input of an e-mail address of a destination of an e-mail to the address input field 303 shown in FIG. 8 (in FIG. 8, "user-b@isp2.ne.jp" is input).

In step S64, the CPU 101 of the client computer 15-1 accepts input of a title of the e-mail to the subject input field 306 shown in FIG. 8 (in FIG. 8, "link test mail" is input).

In step S65, the CPU 101 of the client computer 15-1 accepts input of a body of the e-mail to the text input field 307 shown in FIG. 8 (in FIG. 8, "This is a link to" is input). The CPU 101 of the client computer 15-1 also accepts attachment of a file. The processing in step S65 will be described later in detail.

Figure 6:
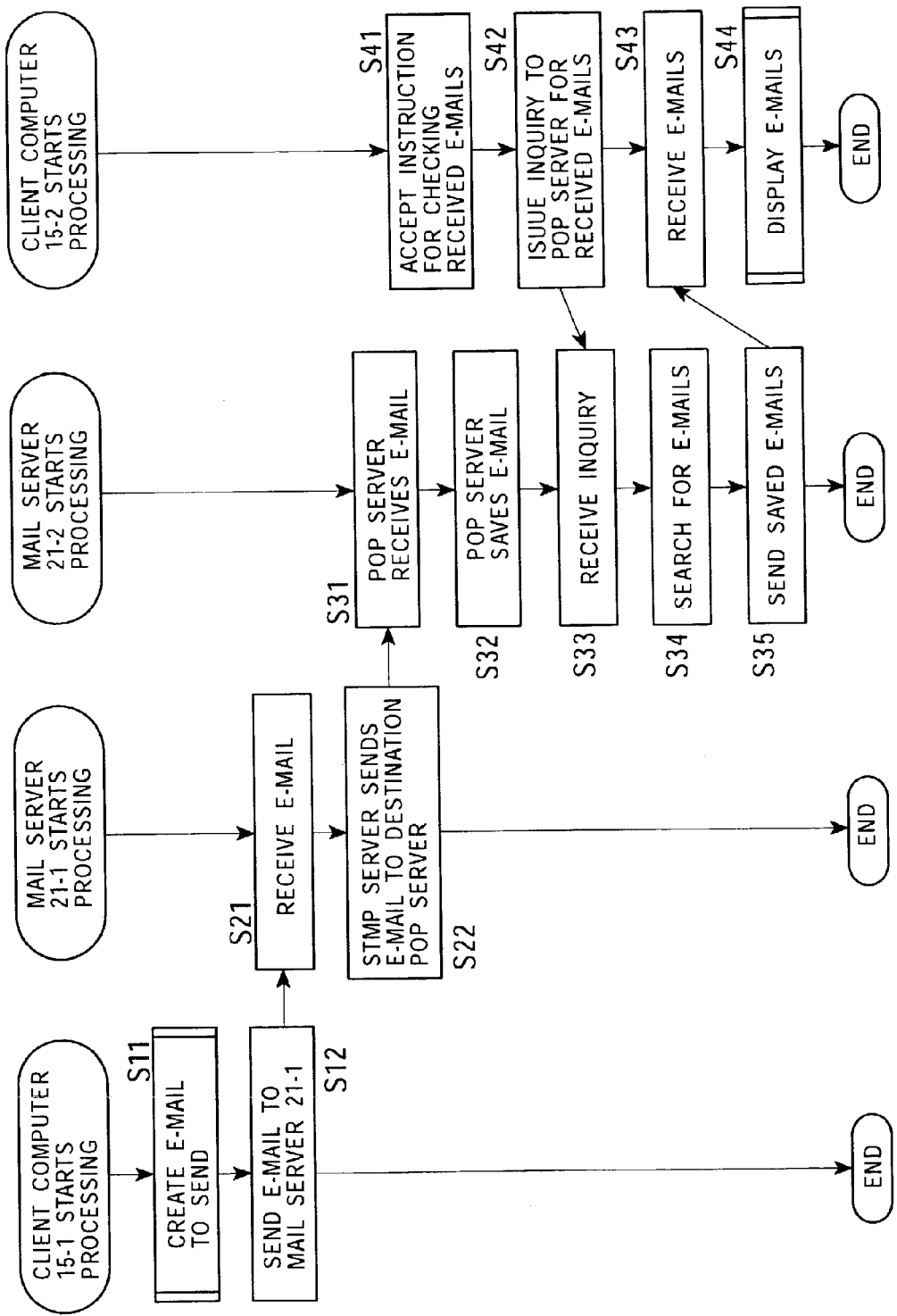
FIG. 6 is a flowchart of processing for exchanging an e-mail in the service providing system shown in FIG. 1.

In step S66, when the CPU 101 of the client computer 15-1 accepts an instruction for sending the e-mail created in the e-mail creating window 301, issued by a click on the send key 302, the procedure proceeds to step S12 in FIG. 6. In step S12, the CPU 101 sends information including an e-mail address of the sender, the subject input in the subject input field 306, the body input in the text input field 307, and the attachment file to the e-mail address input in the address input field 303 (also to e-mail addresses input in the CC input field 304 and the BCC input field 305, if any) via mail servers.

The client computer 15-1 executes processing for creating a new e-mail as described above.

The steps S63 to S65 need not necessarily executed in the order described above. That is, with regard to the processing in steps S63 to S65, the first step, the second step, and the third step may be chosen as desired. For example, the order may be such that input of a body is first accepted, input of a subject is then accepted, and input of an e-mail address is finally accepted. It is also possible to accept input of a body after accepting input of an e-mail address and to then accept changing of the e-mail address.

Furthermore, although acceptance of input of an e-mail address in the CC input field 304 and acceptance of input of an e-mail address in the BCC input field 305 are not described, acceptance of these inputs may be executed before or after the processing in steps S63 to S65 or at desired timings during the processing in steps S63 to S65.

Although the description has been made in relation to the client computer 15-1, the basic processing procedure is the same for other client computers 15-2 to 15-n.

Next, the processing in step S65 in FIG. 7 will be described in detail with reference to FIG. 9.

In step S101, the CPU 101 of the client computer 15-1 determines whether a cursor has been placed in the text input field 307 shown in FIG. 8 and a text has been input via the keyboard (the input unit 106). If a text has been input, the procedure proceeds to step S102, in which the CPU 101 of the client computer 15-1 displays the input text in the text input field 307. The procedure then returns to step S101.

For example, if a cursor has been placed in the text input field 307 and a character string that reads "This is a link to" is input from the keyboard, the input character string that reads "This is a link to" is displayed at a predetermined position of the text input field 307 (from the top left in FIG. 8), as shown in FIG. 8.

If the CPU 101 of the client computer 15-1 determines in step S101 that a text has not been input in the text input field 307, the procedure proceeds to step S103. In step S103, the CPU 101 determines whether a file has been dragged and dropped to the text input field 307. If a file has been dragged and dropped to the text input field 307, the procedure proceeds to step S104, in which the CPU 101 of the client computer 15-1 displays the file dragged and dropped to the text input field 307 in an attachment file display field and also displays a link indication in the text input field 307.

The processing in the steps S103 and S104 will be described with reference to FIGS. 8, 10, and 11.

Figure 10:
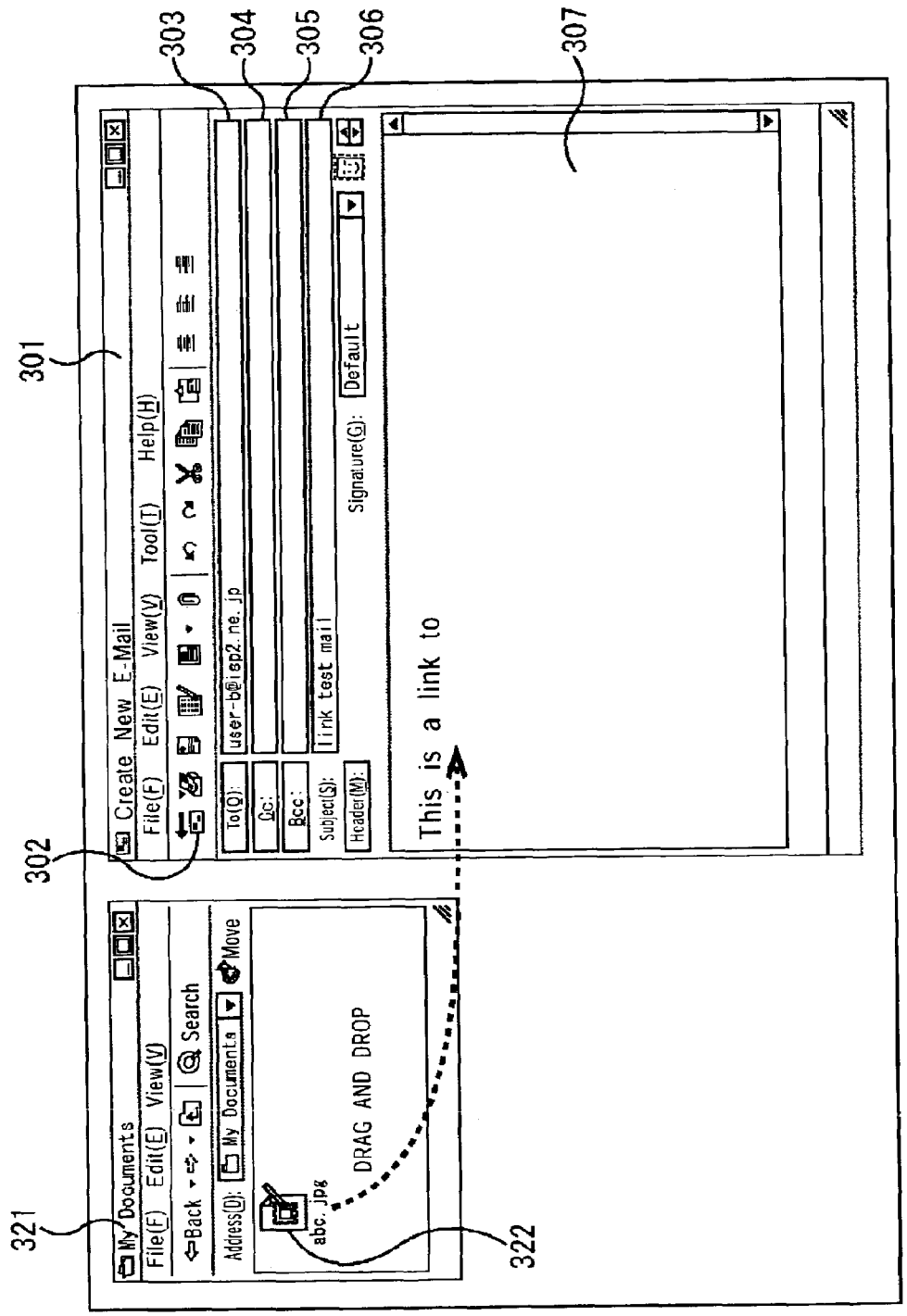
FIG. 10 is an illustration of an example of a screen displayed on the monitor of the client computer in step S103 in FIG. 9.

For example, if the user A performs a predetermined operation via the input unit 106 while the screen shown in FIG. 8 is in display on the monitor 108 of the client computer 15-1, a file creating window 321 is displayed on the monitor 108, as shown in FIG. 10. That is, FIG. 10 shows an example of a screen displayed on the monitor 108 of the client computer 15-1 when the user A inputs an instruction for displaying the file creating window 321 in the screen shown in FIG. 8. In FIG. 10, the same parts as those in FIG. 8 are designated by the same numerals, and repeated descriptions thereof will be refrained unless needed in particular.

As shown in FIG. 10, on the monitor 108 of the client computer 15-1, in addition to the e-mail creating window 301, the file display window 321 is displayed on the left side of the screen. In the file display window 321, a file 322 managed in the folder is displayed. In this example, the file name of the file 322 is "abc.jpg".

The user A drags and drops the file 322 to the text input field 307 in the e-mail creating window 301 by an operation of the mouse (the input unit 106), as indicated by a dotted arrow in FIG. 10. Then, in step S103, the CPU 101 determines that the file 322 has been dragged and dropped to the text input field 307, and the procedure proceeds to step S104.

Figure 11:
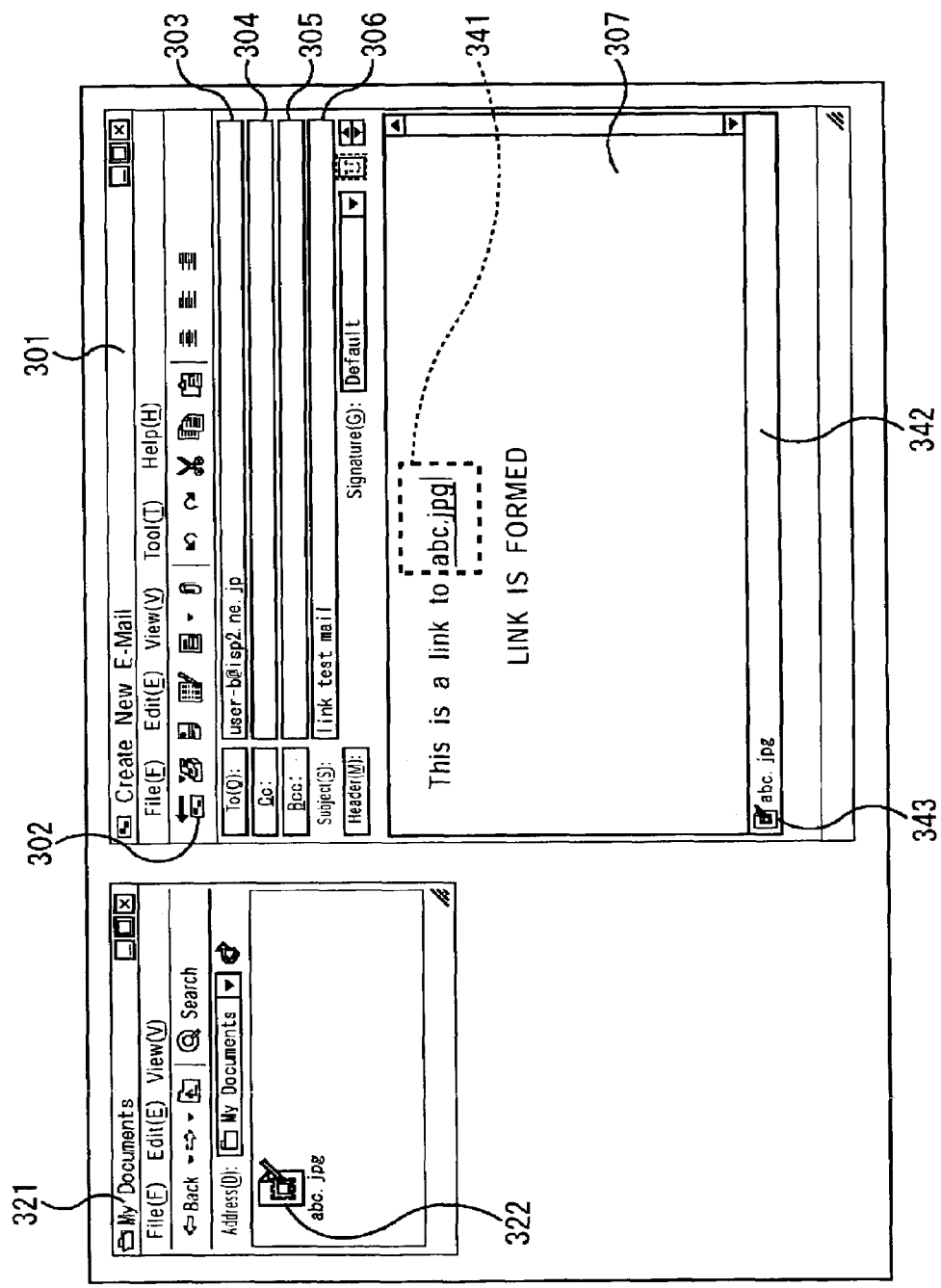
FIG. 11 is an illustration of an example of a screen displayed on the monitor of the client computer in step S104 in FIG. 9.

FIG. 11 shows an example of a screen displayed on the monitor 108 of the client computer 15-1 in step S104. More specifically, FIG. 11 shows an example of a screen displayed on the monitor 108 when the file 322 has been dragged and dropped to the text input field 307 in the screen shown in FIG. 10. In FIG. 11, the same parts as those in FIGS. 9 and 10 are designated by the same numerals, and repeated descriptions thereof will be refrained.

Referring to FIG. 11, an attachment file display field 342 is newly displayed in the e-mail creating window 301, and in the attachment file display field 342, the file 322 named "abc.jpg", dragged and dropped in the text input field 307 in the screen shown in FIG. 10, is displayed as an attachment file 343. Also, a link indication 341 is displayed in the text input field 307. The link indication 341 is displayed as a file name of "abc.jpg". Although the link indication 341 is displayed as the file name at first, the user is allowed to change the file name into other character strings by performing a predetermined operation via the input unit 106.

The link indication 341 is underlined, and displayed in a color different from that of the other part of the text input in the text input field 307 in order to distinguish the link indication 341 from the other text. Thus, a link is formed between the link indication 341 that reads "abc.jpg" in the text input field 307 and the attachment file 343.

A dotted line surrounding the link indication 341, and a legend that reads "link is formed" below the dotted line, shown in FIG. 11, are not actually displayed on the monitor 108 of the client computer 15-1.

As described above, a link is formed to an attachment file that is dragged and dropped to the text input field 307, as in steps S103 and 104. Accordingly, the user is readily allowed to form a link between an attachment file and an e-mail body by an intuitive operation.

When step S104 is complete, the procedure returns to step S101.

Referring back to FIG. 9, if the CPU 101 of the client computer 15-1 determines in step S103 that a file has not been dragged and dropped to the text input field 307, the procedure proceeds to step S105.

In step S105, the CPU 101 of the client computer 15-1 determines whether an instruction for attaching a file has been input from the user A via the input unit 106. If an instruction for attaching a file has been input by the user A via the input unit 106, the procedure proceeds to step S106. In step S106, the CPU 101 of the client computer 15-1 displays a window showing a list of files (and folders) managed by the client computer 15-1 on the monitor 108, and accepts designation of a file to be attached from the list by the user A.

In step S107, the CPU 101 of the client computer 15-1 displays the file designated by the user A in step S106 in the attachment file display field as an attachment file.

Figure 12:
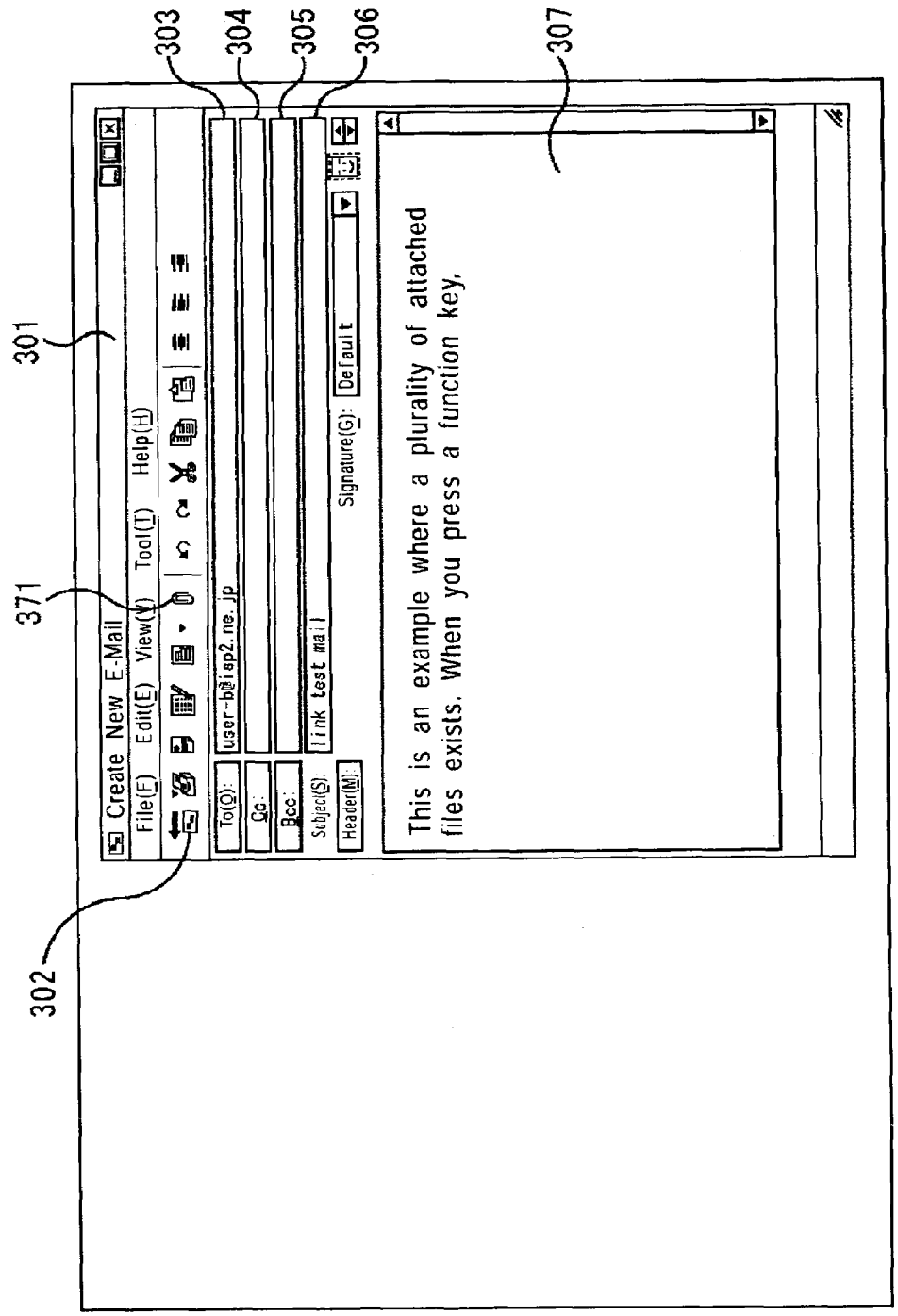
FIG. 12 is an illustration of an example of a screen displayed on the monitor of the client computer in step S105 in FIG. 9.

The processing in steps S105 to S107 will be described with reference to FIGS. 12 and 13. FIG. 12 shows an example of a screen displayed on the monitor 108 of the client computer 15-1. Referring to FIG. 12, an e-mail creating window 301 is displayed on the monitor 108 of the client computer 15-1. A send key 302, an address input field 303, a CC input field 304, a BCC input field 305, a subject input field 306, and a text input field 307 in the e-mail creating window 301 have the same functions as those designated by the same numerals in FIG. 8. In the text input field 307, a character string that reads "This is an example where a plurality of attachment files exists. When you press a function key," has already been input (processing in step S102).

In FIG. 12, an attach key 371 is shown. When the attach key 371 is clicked on by an operation of the mouse (the input unit 106) by the user A, the CPU 101 determines in step S105 that attachment of a file has been instructed, and in step S106, it displays a new window on the monitor 108 of the client computer 15-1 and displays a list of files managed in the client computer 15-1 in the window to accept designation of files to be attached.

When files to be attached have been designated by the user A in step S106, the procedure proceeds to step S107. In step S107, the CPU 101 of the client computer 15-1 displays the files designated in step S106 as attachment files 401-1 to 401-3 in the attachment file display field 342 on the monitor 108, as shown in FIG. 13.

Figure 13:
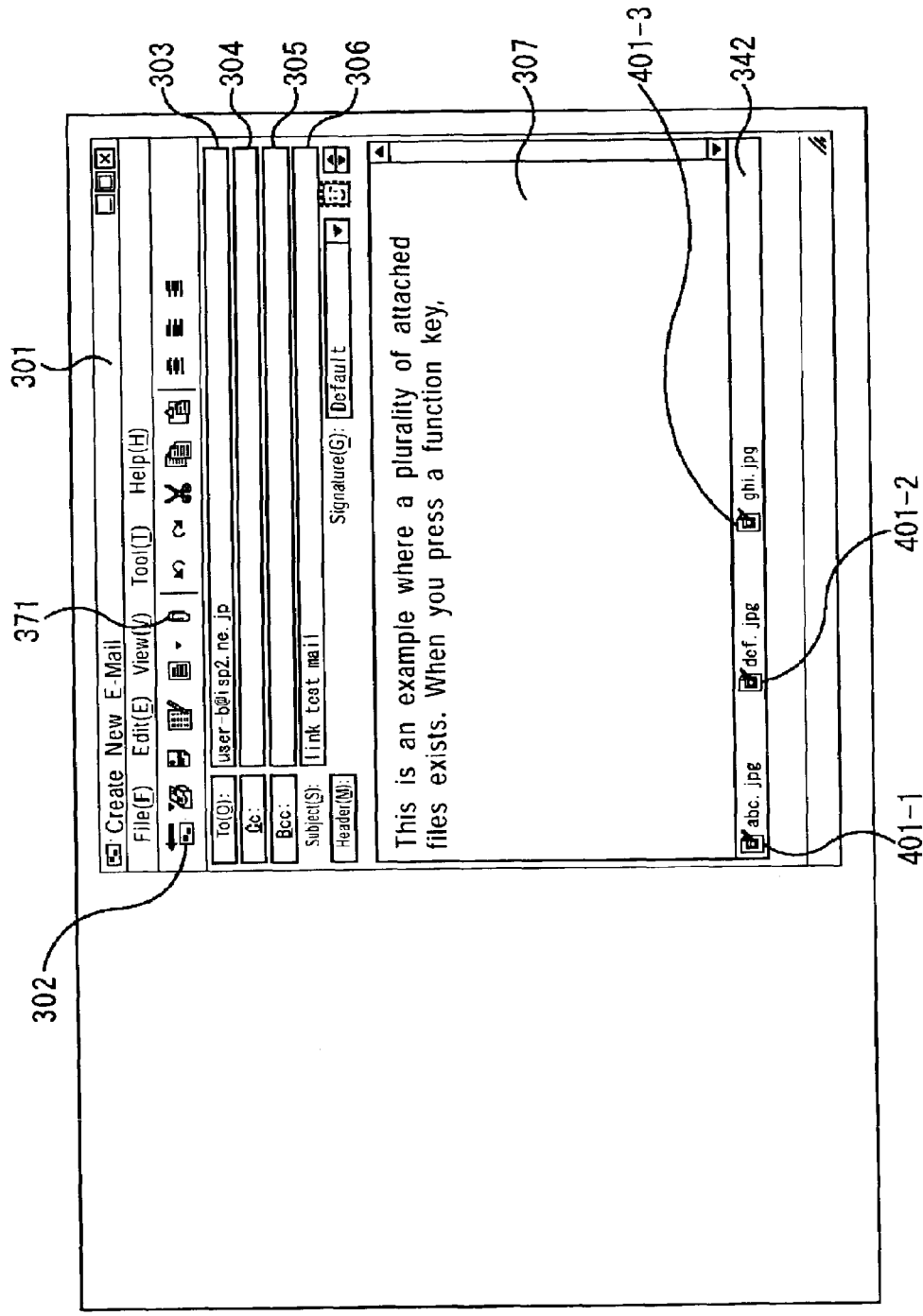
FIG. 13 is an illustration of an example of a screen displayed on the monitor of the client computer in step S107 in FIG. 9.

FIG. 13 shows an example of a screen displayed on the monitor 108 of the client computer 15-1 when the files to be attached have been designated by the user A in the screen shown in FIG. 12. In FIG. 13, the attachment file display field 342 is displayed, in which the attachment files 401-1 to 401-3 are displayed. This indicates that the attachment file 401-1 (with a file name of "abc.jpg"), the attachment file 401-2 (with a file name of "def.jpg"), and the attachment file 401-3 (with a file name of ghi.jpg") have been designated as files to be attached by the user A.

The number of files designated as attachment files may be smaller or larger than in the above example. Also, although a plurality of files is simultaneously designated as attachment files in the above example, the files may be individually designated for attachment.

In this manner, a plurality of files is designated as attachment files by the processing in steps S105 to S107.

Figure 9:
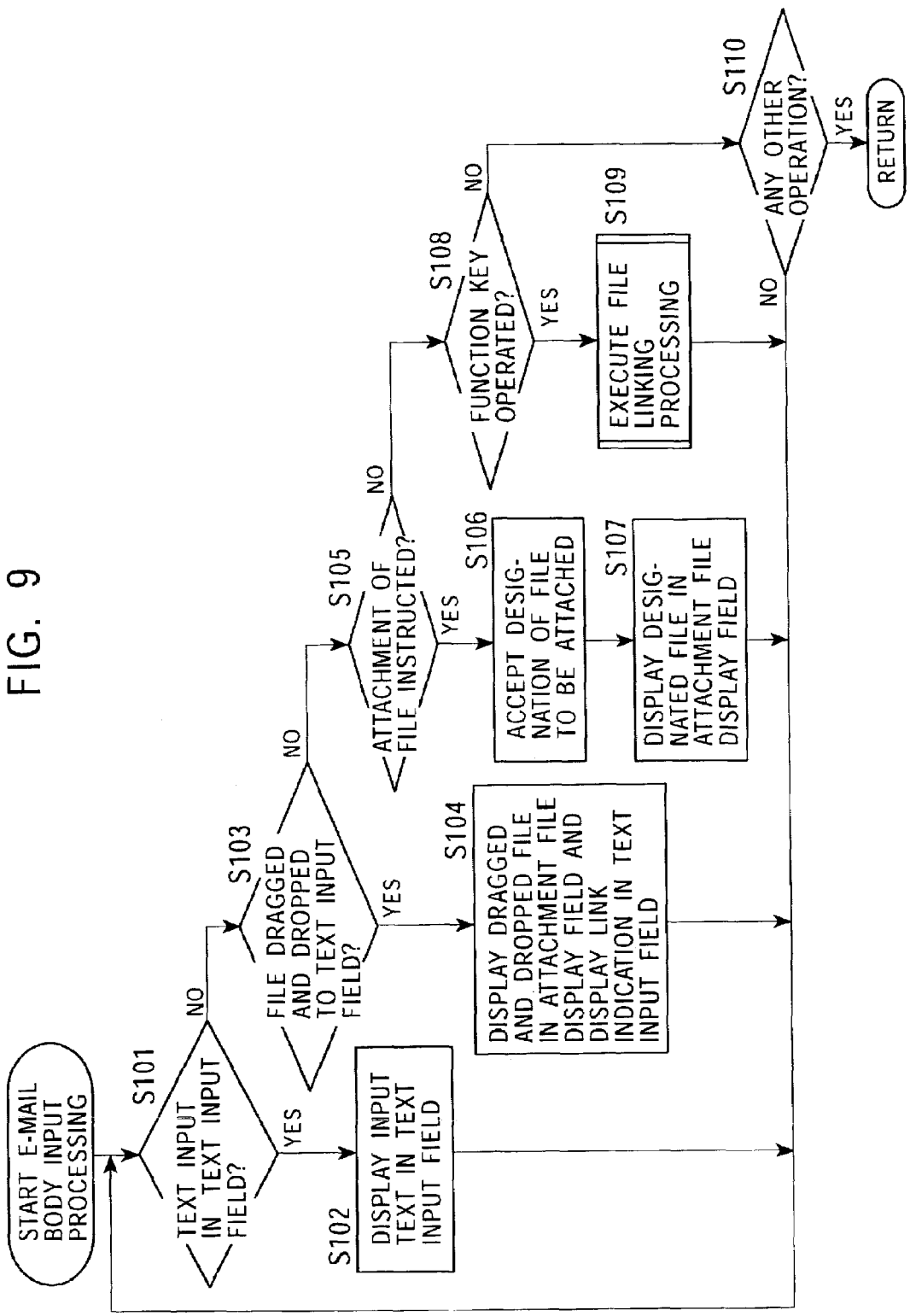
FIG. 9 is a detailed flowchart of processing in step S65 in FIG. 7.

If the CPU 101 of the client computer 15-1 determines in step S105 in FIG. 9 that an instruction for attaching a file has not been input by the user A, the procedure proceeds to step S108. In step S108, the CPU 101 of the client computer 15-1 determines whether a function key of the keyboard (the input unit 106) has been operated. If a function key of the keyboard (the input unit 106) has been operated, the procedure proceeds to step S109.

In step S109, the CPU 101 of the client computer 15-1 forms a link between the file designated to be attached to the e-mail by the processing in steps S105 to S107 and the body being input in the text input field 307.

Figure 14:
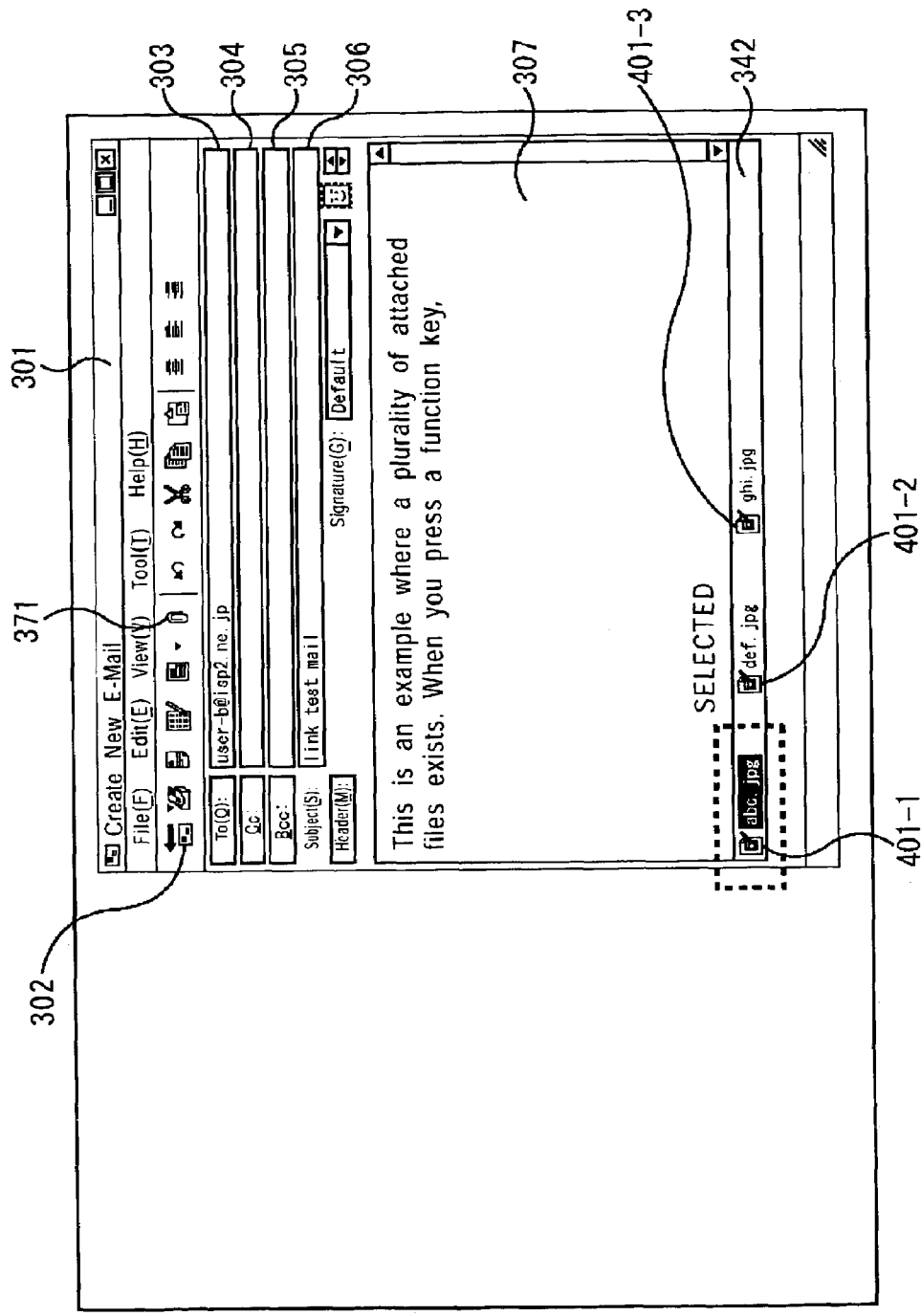
FIG. 14 is an illustration of an example of a screen displayed on the monitor of the client computer in step S109 in FIG. 9.
Figure 15:
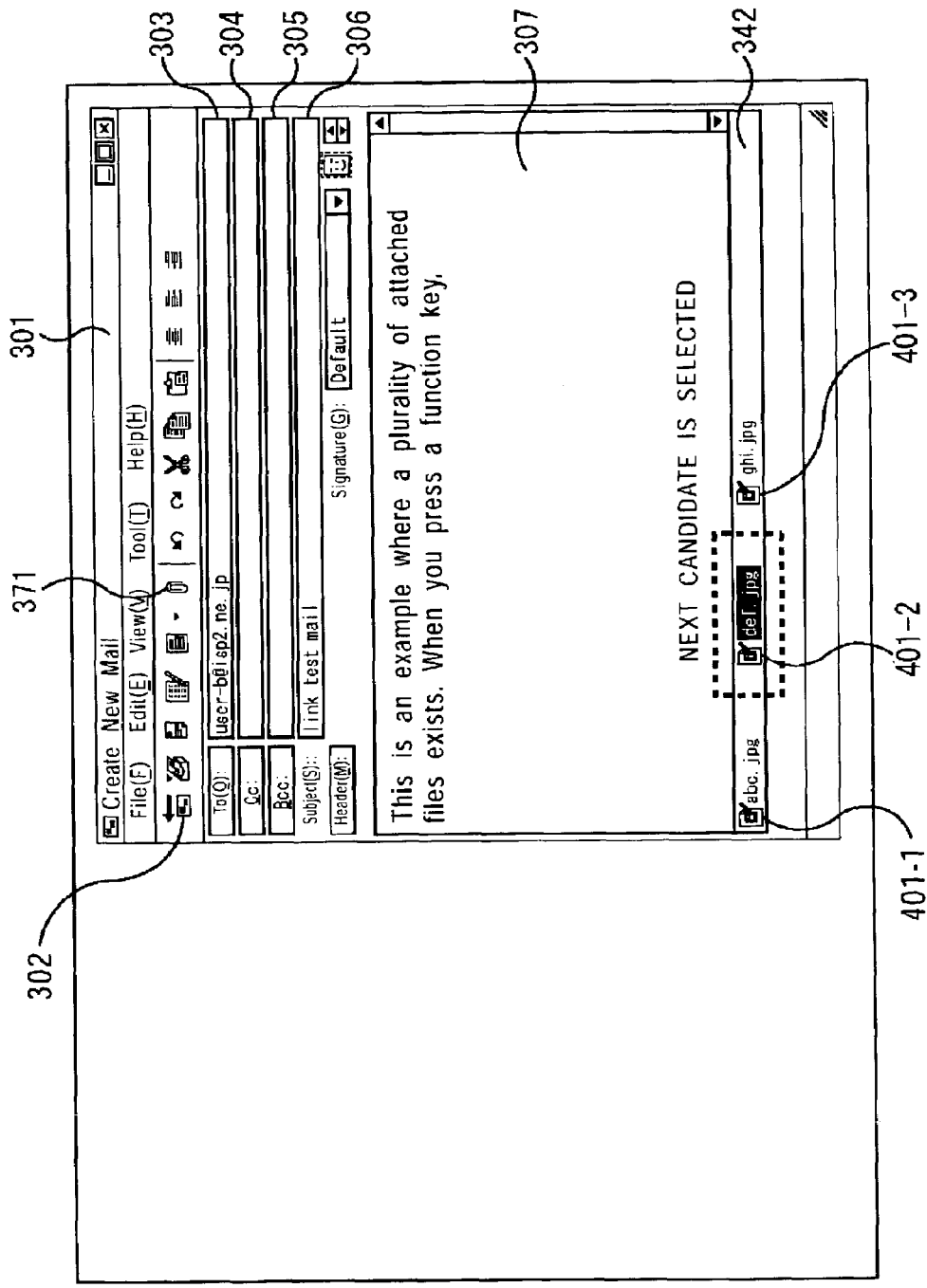
FIG. 15 is an illustration of an example of a screen displayed on the monitor of the client computer subsequent to the screen shown in FIG. 14 in step S109 in FIG. 9.
Figure 16:
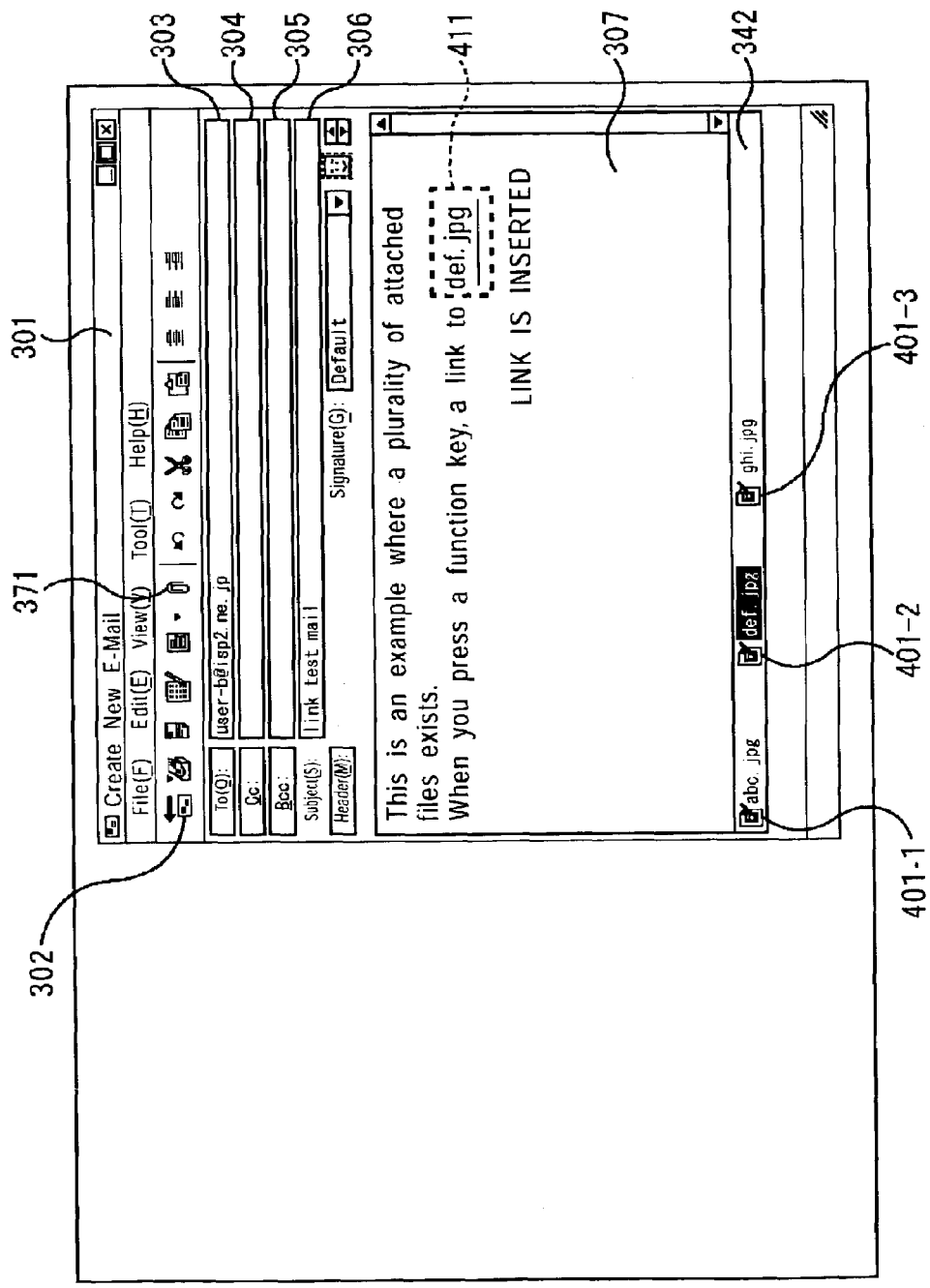
FIG. 16 is an illustration of an example of a screen displayed on the monitor of the client computer subsequent to the screen shown in FIG. 15 in step S109 in FIG. 9.
Figure 17:
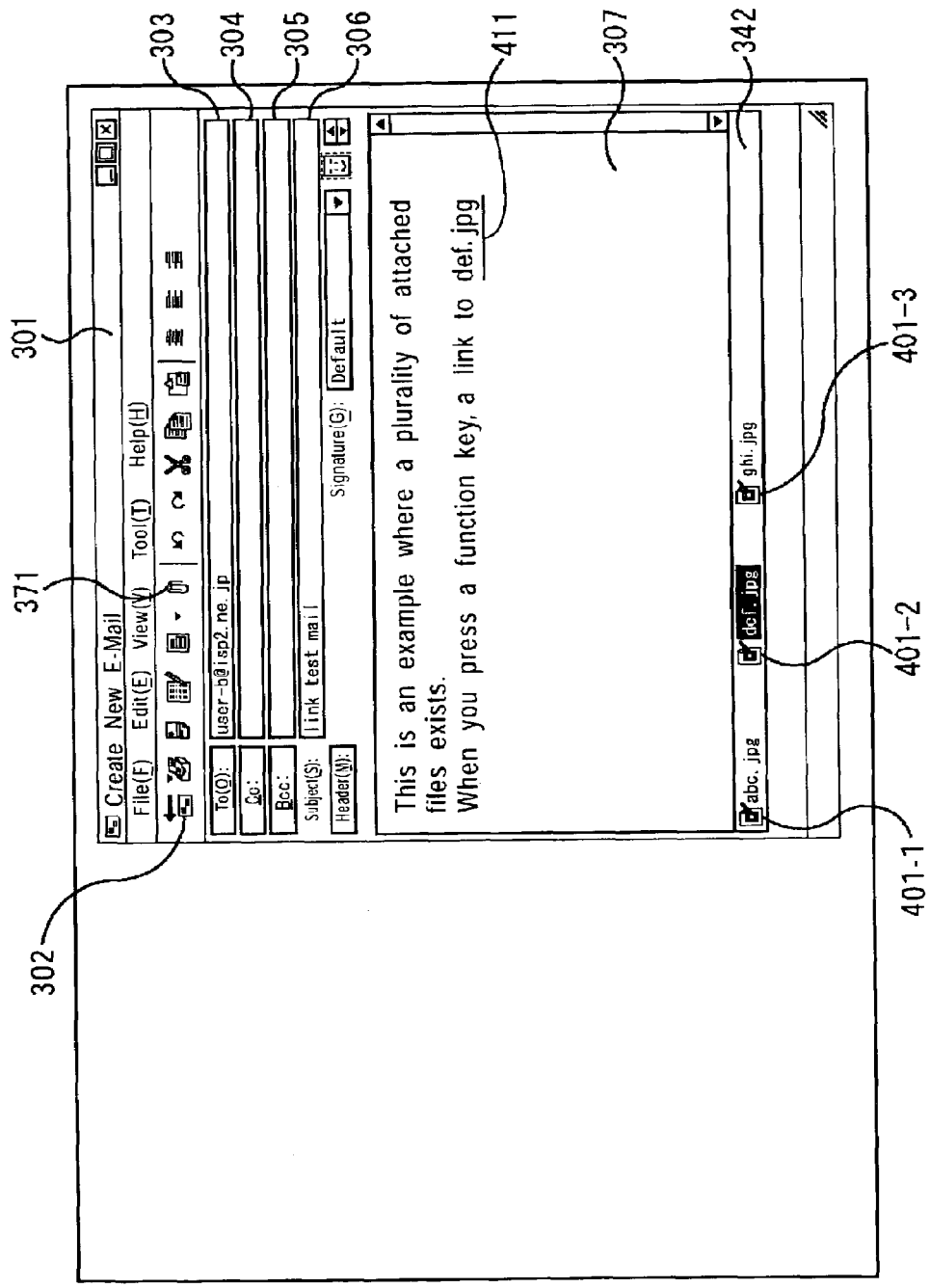
FIG. 17 is an illustration of an example of a screen displayed on the monitor of the client computer subsequent to the screen shown in FIG. 16.

The processing in steps S108 and S109 will be described with reference to FIGS. 13 to 17. FIG. 14 shows an example of a screen displayed on the monitor 108 of the client computer 15-1 subsequent to the screen shown in FIG. 13. FIGS. 15 to 17 show screens displayed on the monitor 108 of the client computer 15-1 in step S109 in order of operations. The same parts in FIGS. 13 to 17 are designated by the same numerals, and repeated descriptions thereof will be refrained.

If the CPU 101 of the client computer 15-1 determines in step S108 that a function key has been operated while the screen shown in FIG. 13 is in display on the monitor 108 of the client computer 15-1, the procedure proceeds to step S109. In step S109, the CPU 101 of the client computer 15-1 highlights the leftmost attachment file 401-1 among the attachment files 401-1 to 401-3 displayed in the attachment file display field 342 shown in FIG. 13, as shown in FIG. 14. A dotted line surrounding the attachment file 401-1, and a legend that reads "selected" in the proximity of the dotted line, shown in FIG. 14, are not actually displayed.

If a TAB key of the keyboard is operated in this state, the attachment file 401-1 is dehighlighted and the attachment file 401-2 next to the right is highlighted instead. A dotted line surrounding the attachment file 401-2, and a legend that reads "next candidate is selected" in the proximity of the dotted line, shown in FIG. 15, are not actually displayed. If an Enter key of the keyboard is operated while the screen shown in FIG. 15 is in display on the monitor 108 of the client computer 15-1, the file name "def.jpg" of the attachment file 401-2 highlighted in FIG. 15 is displayed in the text input field 307 as a link indication 411. A dotted line surrounding the link 411, and a legend that reads "link is inserted" below the dotted line, shown in FIG. 16, are not actually displayed.

In this manner, the user A selects a desired attachment file, in this example, the attachment file 401-2, from the plurality of attachment files 401-1 to 401-3 displayed in the attachment file display field 342, and displays the link indication 411 for the selected attachment file 401-2, whereby a link is inserted.

The user is allowed to input text further after the link indication 411 has been inserted, as shown in FIG. 17. In FIG. 17, a character string that reads "link is formed." is input (step S102)

If the user A further operates a TAB key in the screen shown in FIG. 15, the CPU 101 of the client computer 15-1 dehighlights the attachment file 401-2 and highlights the attachment file 401-3 next to the right. If an Enter key is operated in this state, the file name of the attachment file 401-3 is displayed as a link indication at the end of the text input to the text input field 307.

If a TAB key is operated further at this time, the CPU 101 of the client computer 15-1 dehighlights the attachment file 401-3 and highlights the attachment file 401-1 again. If an Enter key is operated in this state, the file name of the attachment file 401-1 is displayed as a link indication at the end of the text input to the text input field 307.

In this manner, the CPU 101 of the client computer 15-1 forms a link between an attachment file desired by the user A and an e-mail body being input in the text input field 307 in step S109 in FIG. 9.

If the CPU 101 of the client computer 15-1 determines in step S108 in FIG. 9 that a function key has not been operated, the procedure proceeds to step S110. In step S110, the CPU 101 of the client computer 15-1 determines whether an instruction for processing other than what has been described above has been input (for example, whether the send key 302 in FIG. 17 has been clicked on). If such an instruction has not been input, the procedure returns to step S101, and processing in and subsequent to step S101 described above is repeated.

Figure 7:
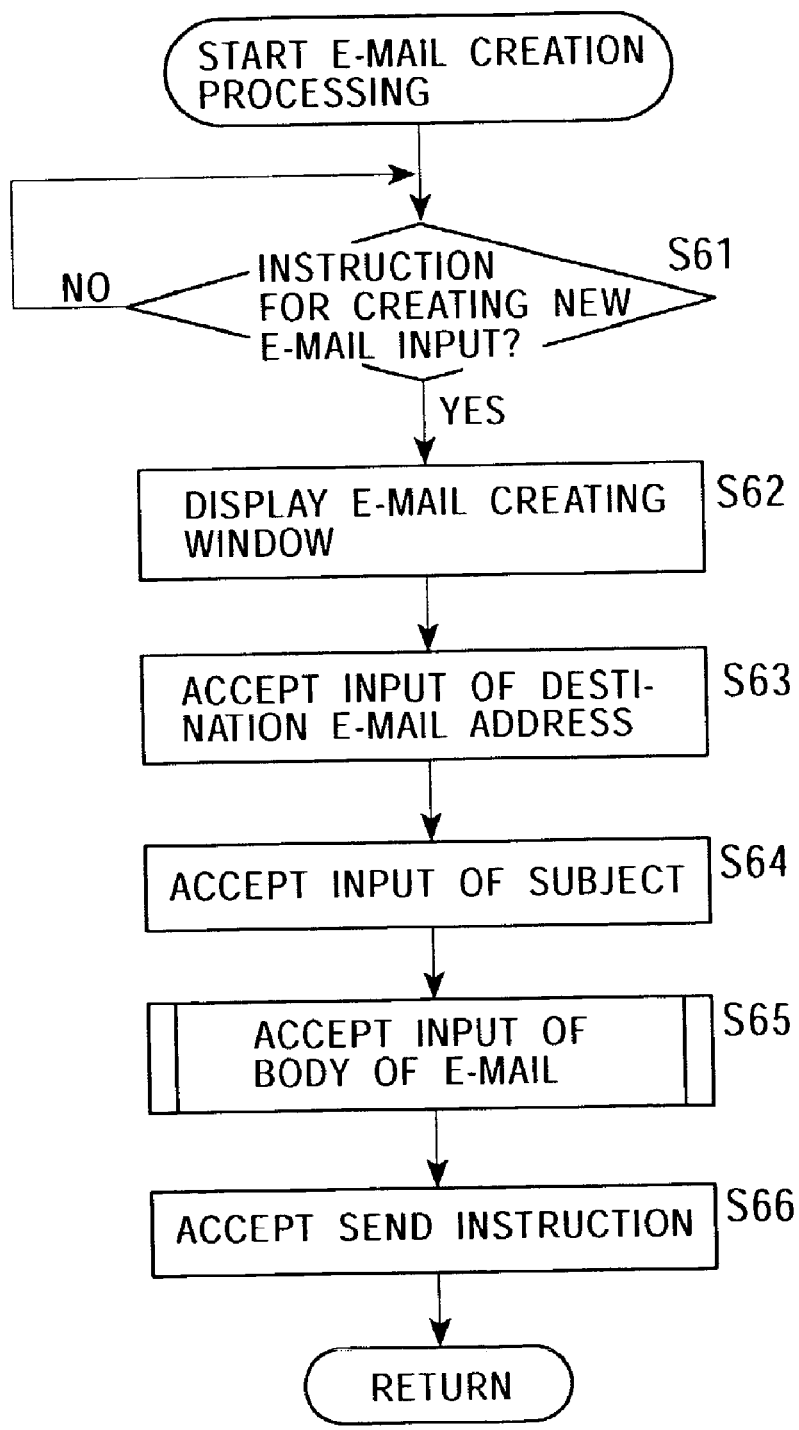
FIG. 7 is a detailed flowchart of processing in step S11 in FIG. 6.

If the CPU 101 of the client computer 15-1 determines in step S110 that an instruction for processing other than what has been described above has been input via the input unit 106, the processing shown in the flowchart of FIG. 9 is exited, and the procedure proceeds to step S66 in FIG. 7.

The processing for inputting an e-mail body is executed as described above.

Although the processing in steps S108 and S109 has been described as executed only once, it is also possible to form links to other attachment files (e.g., the attachment files 401-1 and 401-3 in FIG. 13) after forming a link to an attachment file. In that case, link indications respectively associated with the attachment files are displayed among a text being input in the text input field 307.

By inserting a plurality of links associated with a plurality of attachment files in appropriate positions in a text being input in the text input field 307 as described above, the association between the context of the e-mail body input in the text input field 307 and the attachment files is clarified.

Figure 18:
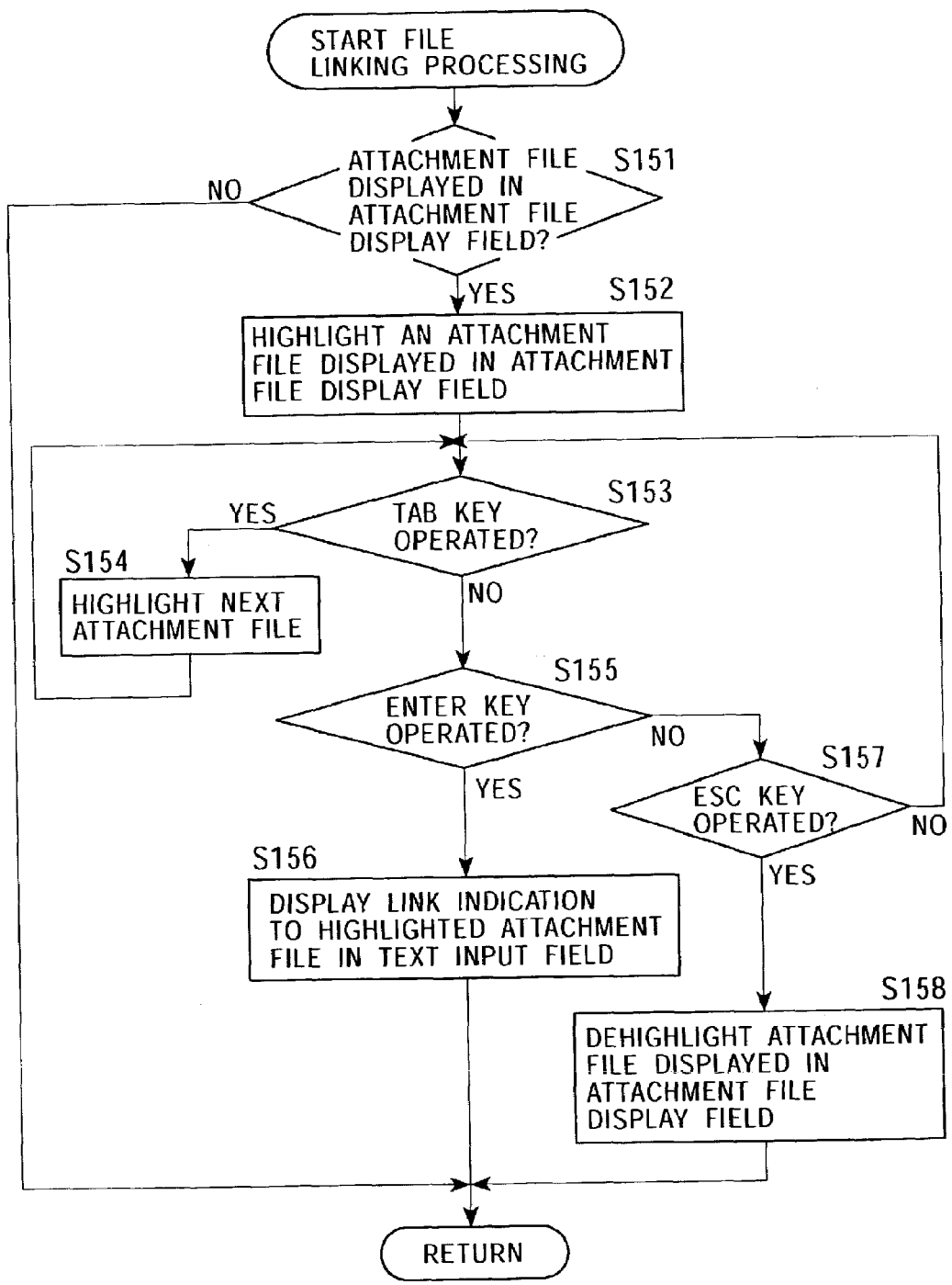
FIG. 18 is a detailed flowchart of processing in step S109 in FIG. 9.

Next, the processing in step S109 in FIG. 9 will be described in detail with reference to a flowchart shown in FIG. 18.

In step S151, the CPU 101 of the client computer 15-1 determines whether an attachment file is displayed in the attachment file display field 342 in the e-mail creating window 301 as shown in FIG. 13. If an attachment file is not displayed in the attachment file display field 342 in the e-mail creating window 301, the processing in the flowchart of FIG. 18 is exited, and the procedure returns to step S101 in FIG. 9.

If the CPU 101 of the client computer 15-1 determines in step S151 that an attachment file is displayed in the attachment file display field 342 in the e-mail creating window 301, the procedure proceeds to step S152.

In step S152, the CPU 101 of the client computer 15-1 highlights the leftmost attachment file 401-1 among the attachment files 401-1 to 401-3 displayed in the attachment file display field 342, as shown in FIG. 14.

In step S153, the CPU 101 of the client computer 15-1 determines whether a TAB key of the keyboard has been operated by the user. If a TAB key has been operated, the procedure proceeds to step S154, in which the CPU 101 of the client computer 15-1 shifts highlighting of an attachment file displayed in the attachment file display field 342 to the next attachment file, as shown in FIG. 15 (in FIGS. 14 and 15, highlighting is shifted from the attachment file 401-1 to the attachment file 401-2).

If the CPU 101 of the client computer 15-1 determines in step S153 that a TAB key of the keyboard has not been operated by the user, the procedure proceeds to step S155. In step S155, the CPU 101 of the client computer 15-1 determines whether an Enter key of the keyboard has been operated. If an Enter key of the keyboard has been operated, the procedure proceeds to step S156.

In step S156, the CPU 101 of the client computer 15-1 displays the file name of the highlighted attachment file as a link indication 411 in the text input field 307, as shown in FIG. 16. The characters constituting the link indication 411 are the file name of the attachment file at first; however, the characters may be changed later.

When step S156 is complete, the procedure returns to step S101 in FIG. 9.

If the CPU 101 of the client computer 15-1 determines in step S155 that an Enter key has not been operated, the procedure proceeds to step S157. In step S157, the CPU 101 of the client computer 15-1 determines whether an ESC key of the keyboard has been operated. If an ESC key has been operated, the procedure proceeds to step S158, in which the CPU 101 of the client computer 15-1 dehighlights the attachment file displayed in the attachment file display field 342, for example, the attachment file 401-1.

The procedure then returns to step S101 in FIG. 9.

The processing for linking a file is executed as described above.

FIG. 19A shows the configuration of data of the e-mail body and the attachment file to be sent to the mail server 21-1 in step S12 in FIG. 6 after forming a link to the attachment file as described above. As shown in FIG. 19B, the e-mail body and the attachment file are encoded in a tree structure based on MIME (Multipurpose Internet Mail Extensions).

More specifically, referring to FIG. 19A, the e-mail data includes an e-mail header 421, an e-mail body 422 in text format, an e-mail body 423 in HTML (HyperText Markup Language) format, and an attachment file 424. These items form a tree structure as shown in FIG. 19B.

A description 425 (enclosed in a rectangle) in the e-mail body 423 in HTML format in FIG. 19A, indicating a link to the attachment file, indicates a link between the e-mail body 423 and the attachment file 424.

That is, the part that reads "<A href="abc.jpg">abc.jpg</A>" of the description 425 that reads "This is a link to <A href="abc.jpg">abc.jpg</A>." indicates a link to the attachment file with the file name of "abc.jpg".

The data in the tree structure shown in FIGS. 19A and 19B is sent to a client computer at a destination via mail servers.

Figure 20:
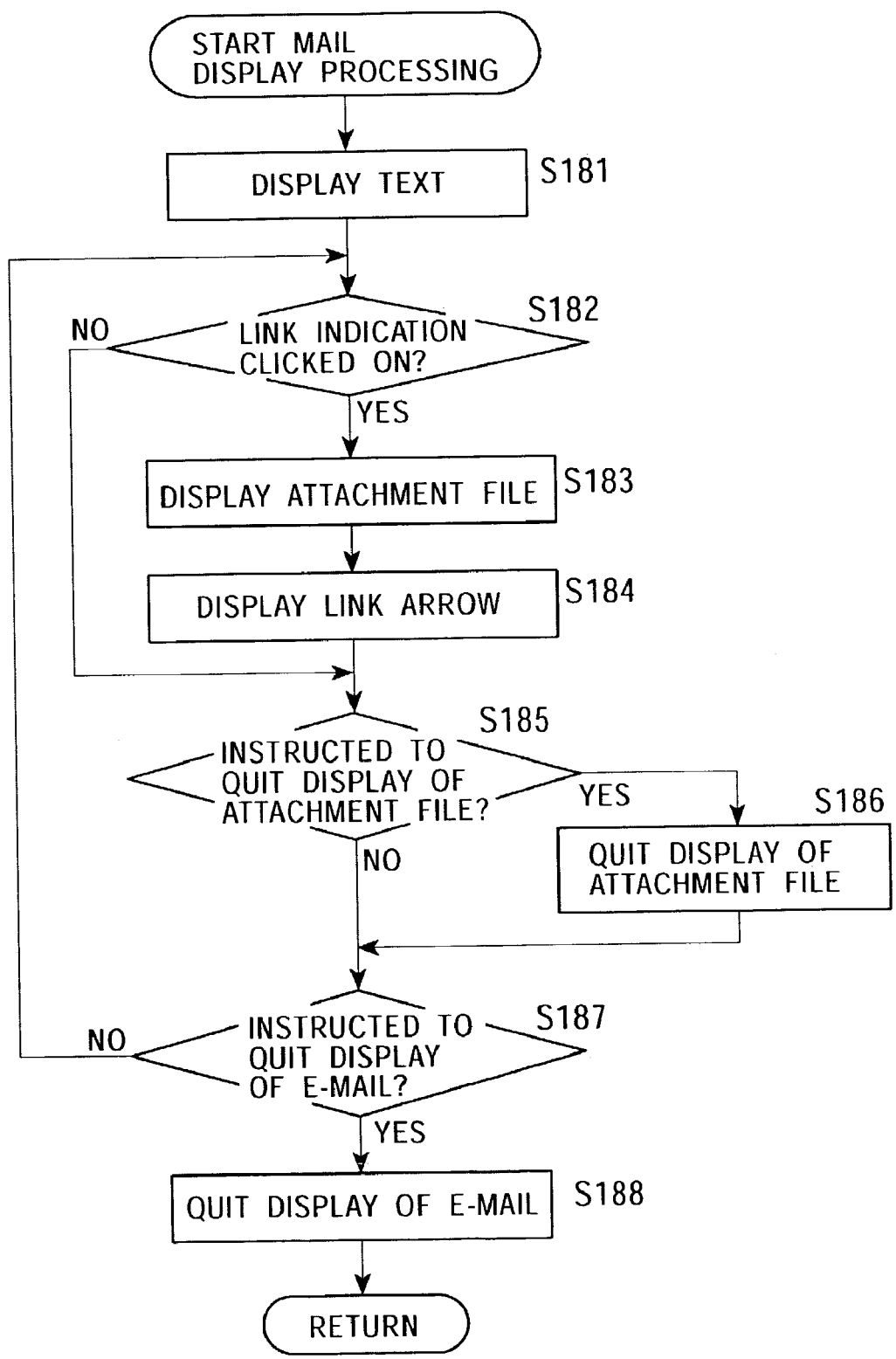
FIG. 20 is a detailed flowchart of processing in step S44 in FIG. 6.

Next, processing for displaying a received e-mail in step S44 in FIG. 6 will be described with reference to a flowchart shown in FIG. 20 and example screens on the monitor 108 of the client computer 15-2 shown in FIGS. 21 and 22.

In step S181, the CPU 101 of the client computer 15-2 reads the e-mail body from the e-mail data received in step S43 in FIG. 6, and displays the e-mail body at a predetermined position on the monitor 108 of the client computer 15-2.

Figure 21:
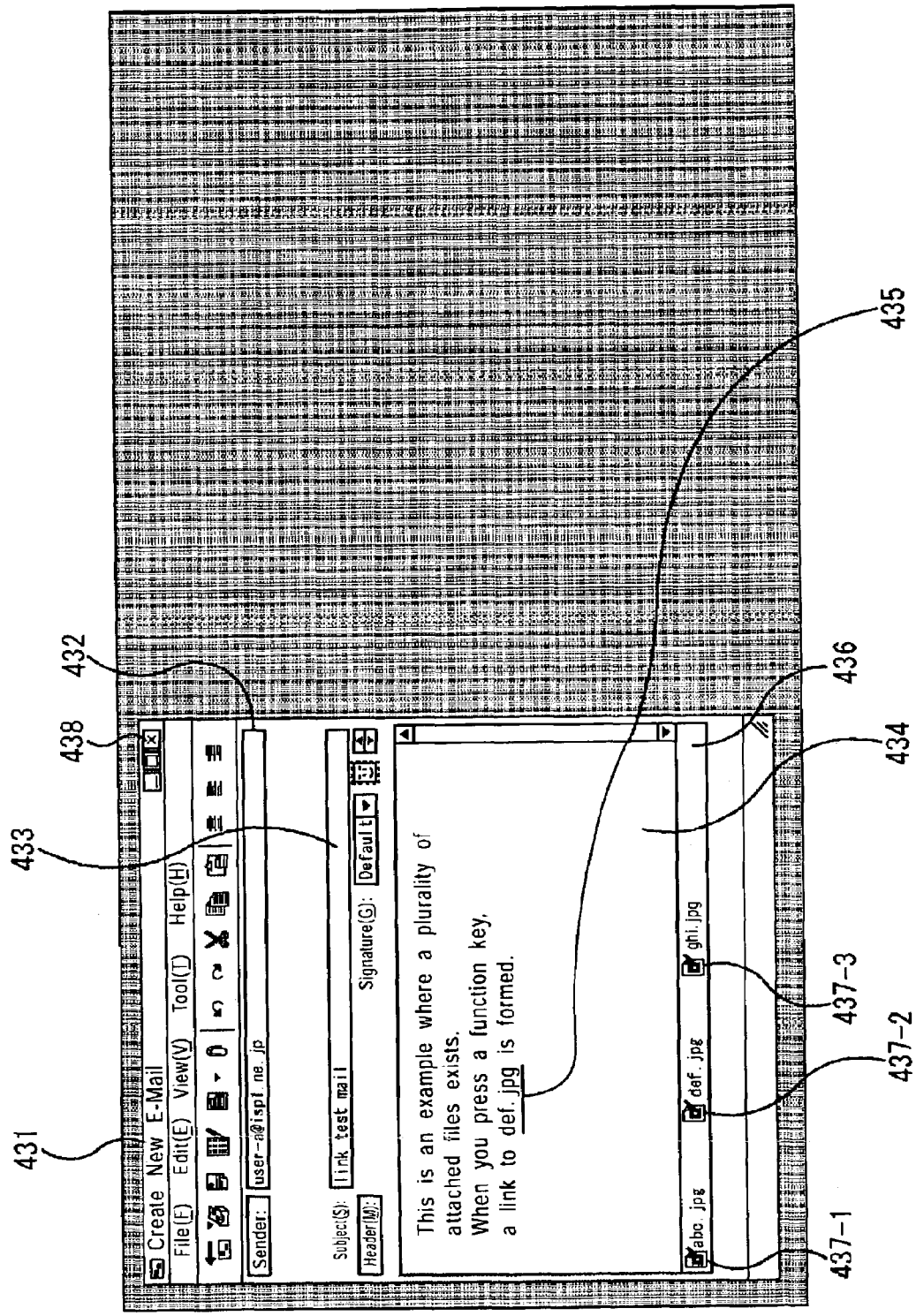
FIG. 21 is an illustration of an example of a screen displayed on the monitor of the client computer in step S181 in FIG. 20.

FIG. 21 shows an example of a received e-mail displayed on the monitor 108 of the client computer 15-2.

Referring to FIG. 21, a received e-mail displaying window 431 is displayed on the monitor 108 of the client computer 15-2. In the received e-mail displaying window 431, a sender address display field 432 in which an e-mail address of the sender of the e-mail ("user-a@isp1.ne.jp" in FIG. 21) is displayed, a subject display filed 433 in which a title of the received e-mail ("link test mail" in FIG. 21) is displayed, a text display filed 434 in which a body of the received e-mail is displayed, and an attachment file display field 436 in which files attached to the received e-mail (attachment files 437-1 to 437-3 in FIG. 21) are displayed.

Referring to FIG. 21, in step S181, on the monitor 108 of the client computer 15-1, the received e-mail displaying window 431 is displayed, and in the text display field 434, the body of the received e-mail, i.e., "This is an example where a plurality of files exists. When you press a function key, a link to def.jpg is formed.", is displayed. In the e-mail body, "def.jpg" is a link indication 435, which is underlined and displayed in a color different from that of the other part of the text.

In step S182, the CPU 101 of the client computer 15-2 determines whether the link indication 435 shown in FIG. 21 has been clicked on by the mouse (the input unit 106). If the link indication 435 has been clicked on, the procedure proceeds to step S183. In step S183, the CPU 101 of the client computer 15-2 displays an attachment file displaying window 451 on the monitor 108, and displays the attachment file in the attachment file displaying window 451, as shown in FIG. 22. In FIG. 22, the same parts as those in FIG. 21 are designated by the same numerals, and descriptions thereof will be omitted.

Figure 22:
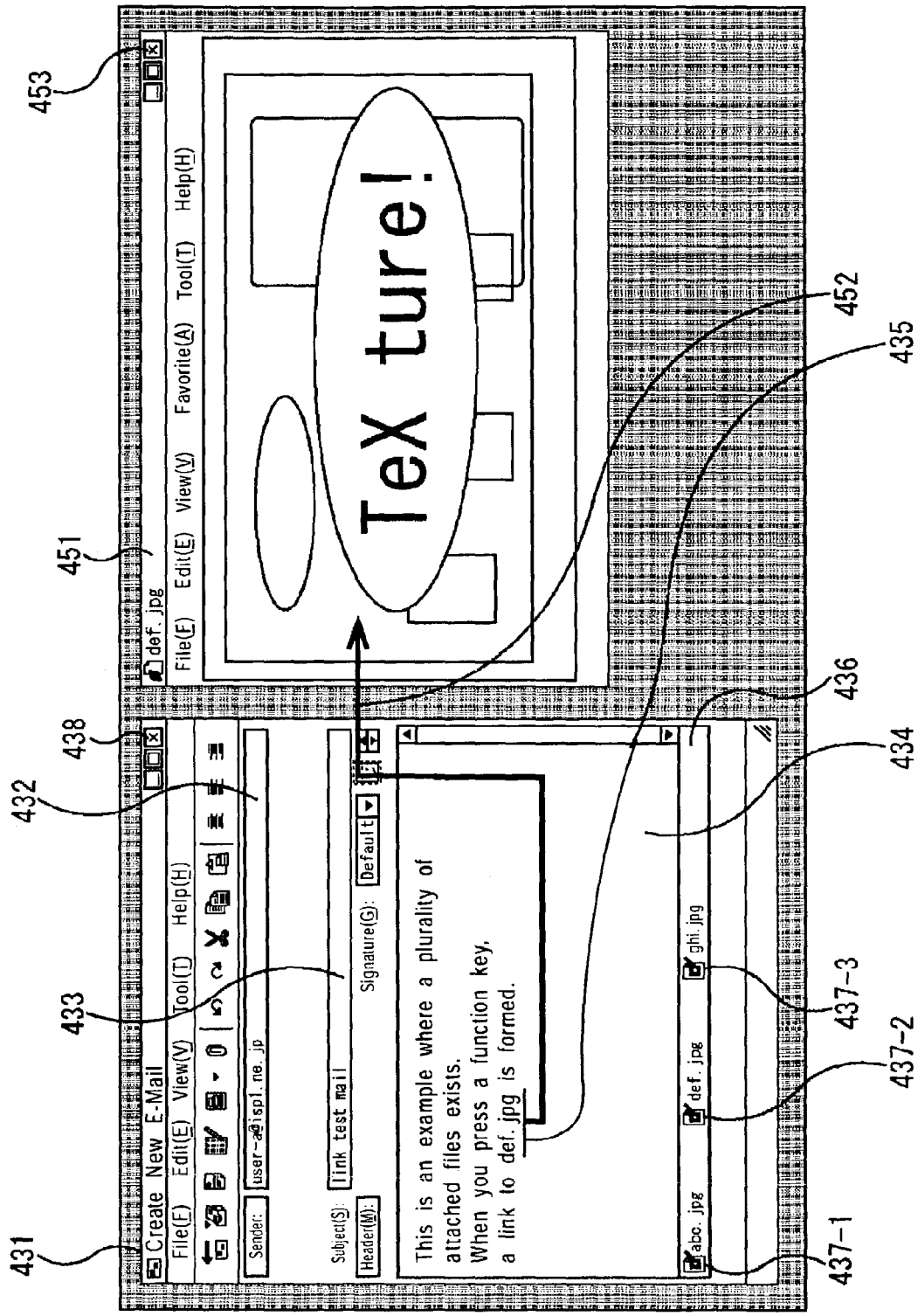
FIG. 22 is an illustration of an example of a screen displayed on the monitor of the client computer in step S184 in FIG. 20.

Upon the attachment file being displayed on the monitor 108 of the client computer 15-2 in step S183, the procedure proceeds to step S184, in which the CPU 101 of the client computer 15-2 displays a link arrow 452 shown in FIG. 22 on the monitor 108.

More specifically, the CPU 101 of the client computer 15-2 displays the link arrow 452 directed from the link indication 435 to the associated attachment file displaying window 451.

Thus, the association between the link indication 435 in the e-mail body and the attachment file displaying window 451 is readily grasped.

The procedure then proceeds to step S185.

If the CPU 101 of the client computer 15-2 determines in step S182 that the link indication 435 has not been clicked on, the procedure skips steps S183 and S184 and proceeds to step S185.

In step S185, the CPU 101 of the client computer 15-2 determines whether a button 453 shown in FIG. 22 has been clicked on by the mouse (the input unit 106) to determine whether an instruction for quitting display of the attachment file has been input. If the button 453 has been clicked on, the procedure proceeds to step S186, in which the CPU 101 of the client computer 15-2 quits display of the attachment file displaying window 451, returning to the screen shown in FIG. 21 on the monitor 108. The procedure then proceeds to step S187.

If the CPU 101 of the client computer 15-2 determines in step S185 that the button 453 has not been clicked on, the procedure proceeds to step S187.

In step S187, the CPU 101 of the client computer 15-2 determines whether a button 438 on the top right of the received e-mail displaying window 431 in the screen shown in FIG. 21 or FIG. 22 has been clicked on by the mouse (the input unit 106) to determine whether an instruction for quitting display of the received e-mail has been input. If the button 438 has not been clicked on, the procedure returns to step S182, and processing in and subsequent to step S182 described above is repeated.

If the CPU 101 of the client computer 15-2 determines in step S187 that the button 438 has been clicked on, the procedure proceeds to step S188. In step S188, the CPU 101 of the client computer 15-2 quits display of the received e-mail displaying window 431 in the screen shown in FIG. 21 or FIG. 22, and exits the processing in the flowchart of FIG. 20.

In this manner, the user B of the client computer 15-2, having received the e-mail sent from the client computer 15-1, displays the body of the e-mail, and if a link indication in the e-mail body is clicked on, it also displays an attachment file associated with the link indication in the attachment file displaying window 451. Thus, even if a plurality of files is attached to the e-mail received, the user B is allowed to readily grasp the association between the e-mail body displayed in the text display field 433 with the attachment files.

That is, the user B is allowed to refer to files as required in accordance with the context of the body by clicking on the link indication 435 in the body while reading the body displayed in the text display filed 434.

The attachment files may be displayed, for example, by a display program included in mailing software, or by other programs of program installed on the client computer 15 (including a word processing program, a spreadsheet program, and an image processing program).

Although a link is formed only with one of the attachment files 437-1 to 437-3, it will be understood that links may be formed with a plurality of attachment files.

The above description has been made in the context of an embodiment where the present invention is applied to an e-mail. Next, an embodiment where the present invention is applied to a chat will be described.

The following description will be made, by way of example, in the context of a chat among the client computers 15-3 to 15-5 shown in FIG. 1. A user that operates the client computer 15-3 will be referred to as a user C, a user that operates the client computer 15-4 will be referred to as a user D, and a user that operates the client computer 15-5 will be referred to as a user E. Furthermore, a nickname of the user C is "CCC", a nickname of the user D is "DDD", and a nickname of the user E is "EEE".

A description will be made in the context of an example where the user E of the client computer 15-5 attaches a file to a chat text and shares it with other client computers 15-3 and 15-4.

Figure 23:
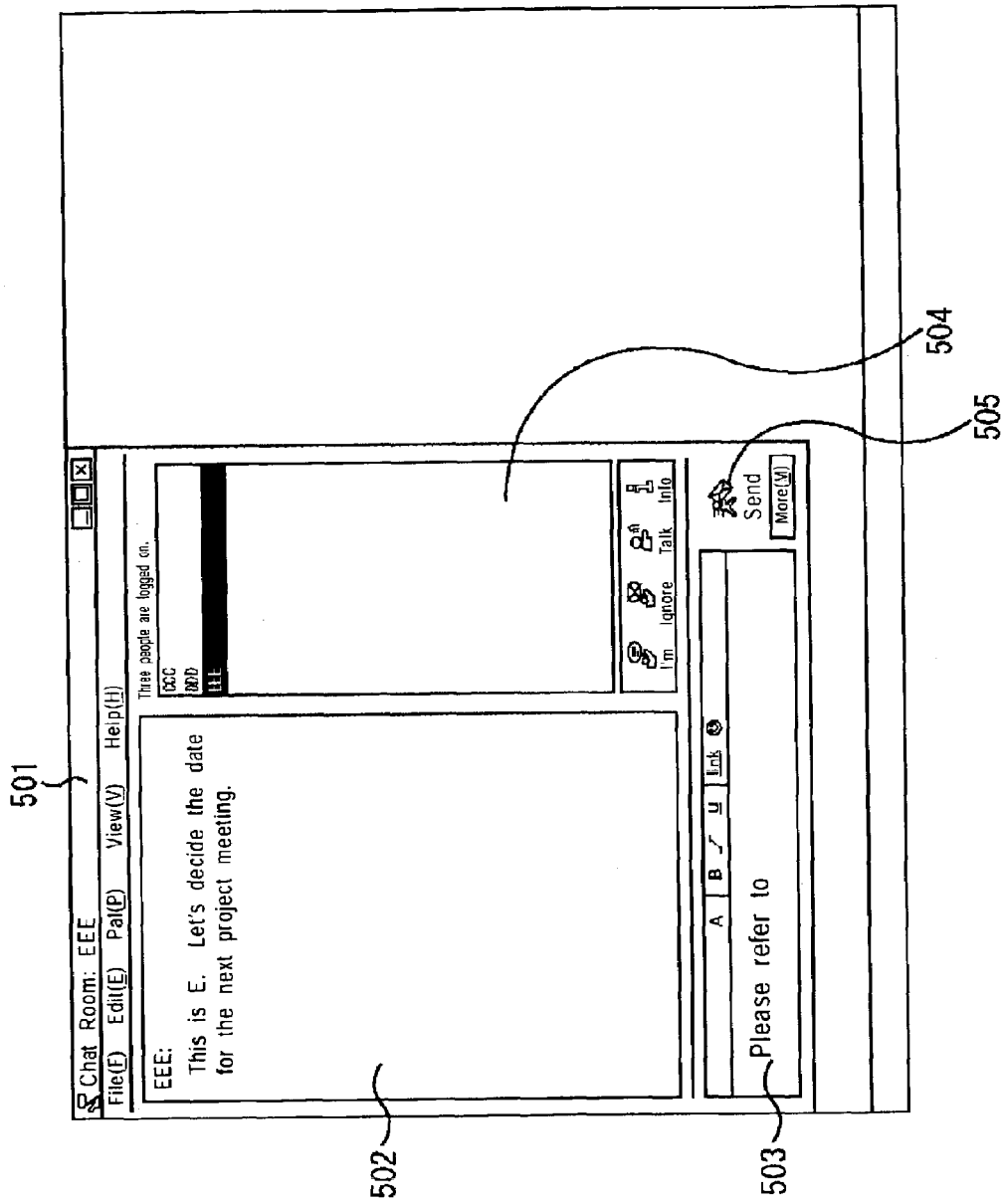
FIG. 23 is an illustration of an example of a screen displayed on a monitor of a client computer participating in a chat.

FIG. 23 shows an example of a screen displayed on the monitor 108 of the client computer 15-5 when a chat client program is activated, chatting is started among the client computers 15-3 to 15-5, and the user E inputs chat log data that reads "This is E. Let's decide the date for the next project meeting."

As shown in FIG. 23, on the left side of the monitor 108 of the client computer 15-5, a chat window 501 is displayed. The chat window 501 includes a log display area 502 in which chat log data is displayed, an input area 503 for accepting input of a chat text, a user list display area 504 in which nicknames of users participating in the chat in the same chat room is displayed, and a send key 505 that is operated when sending the chat text input to the input area 503.

Referring to FIG. 23, the chat log data that reads "This is E. Let's decide the date for the next project meeting." is displayed. The screen indicates that "CCC", "DDD", and "EEE", displayed in the user list display area 504, are participating in the chat in the chat room.

An example of chatting according to the present invention will be described with reference to a flowchart shown in FIG. 24, in the context of a case where a screen shown in FIG. 23 is displayed on the monitor 108 of the client computer 15-5.

In step S331, the CPU 101 of the client computer 15-5 accepts input of a chat text to the input area 503 shown in FIG. 23. FIG. 23 shows a screen with a character string that reads "Please refer to" having been input to the input area 503. The user E is allowed to input the character string by placing a cursor in the input area 503 and operating the keyboard (the input unit 106).

Figure 25:
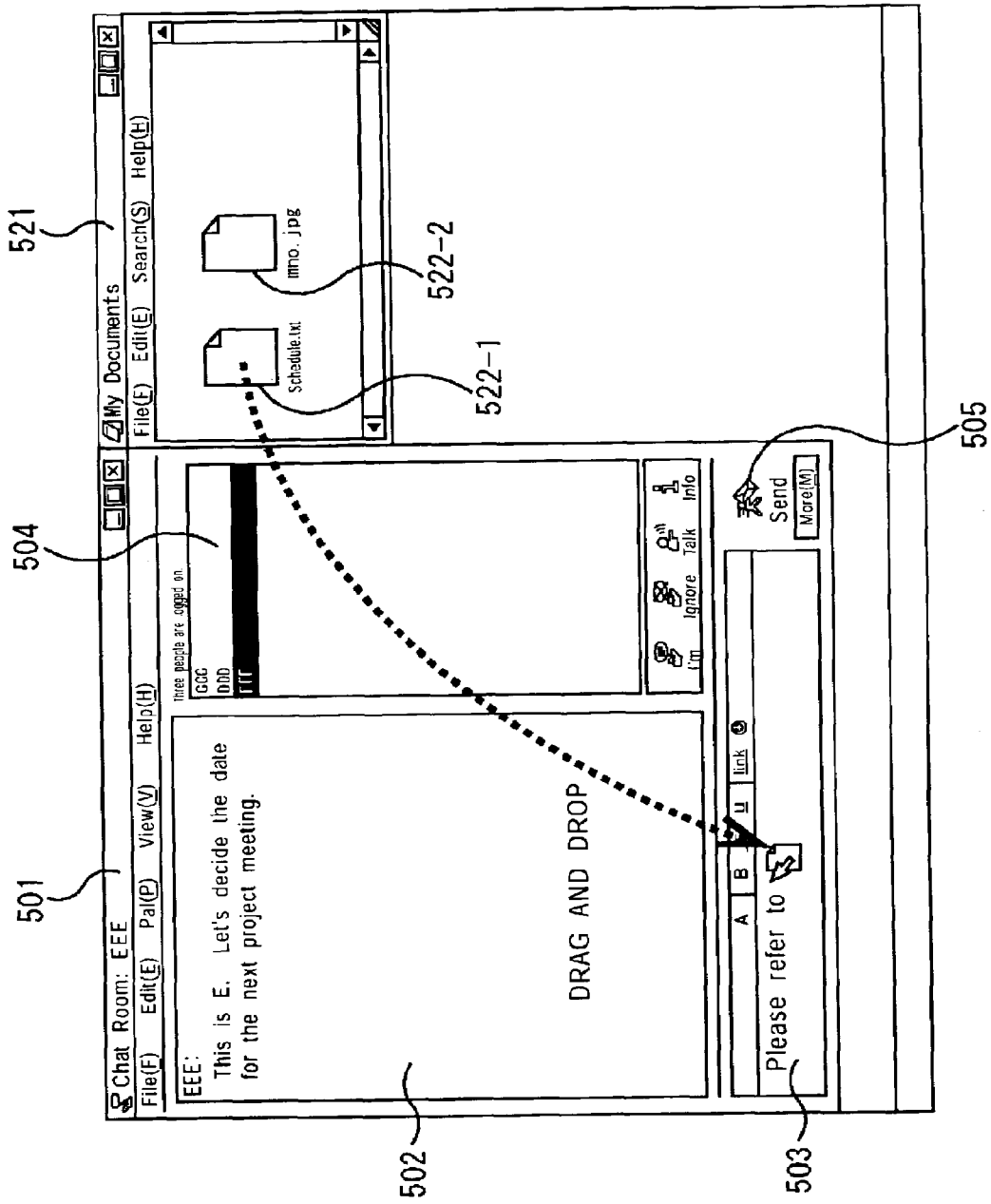
FIG. 25 is an illustration of an example of a screen displayed on the monitor of the client computer in step S332 in FIG. 24.

In step S332, the CPU 101 of the client computer 15-5 accepts attachment of a file, as shown in FIG. 25.

More specifically, referring to FIG. 25, the user E first performs a predetermined operation via the input unit 106 to display a file displaying window 521 on the monitor 108 of the client computer 15-5. In the file displaying window 521, a file 522-1 (with a file name of "schedule.txt") and a file 522-2 (with a file name of mno.jpg") are displayed.

For example, if the file 522-1 displayed in the file displaying window 521 is dragged and dropped to the input area 503 by an operation of the mouse (the input unit 106), as indicated by a dotted arrow, the CPU 101 of the client computer 15-5 displays the file 522-1 at the end of the chat text that reads "Please refer to", being input to the input area 503, as a link indication 541 that reads "schedule.txt.

Figure 26:
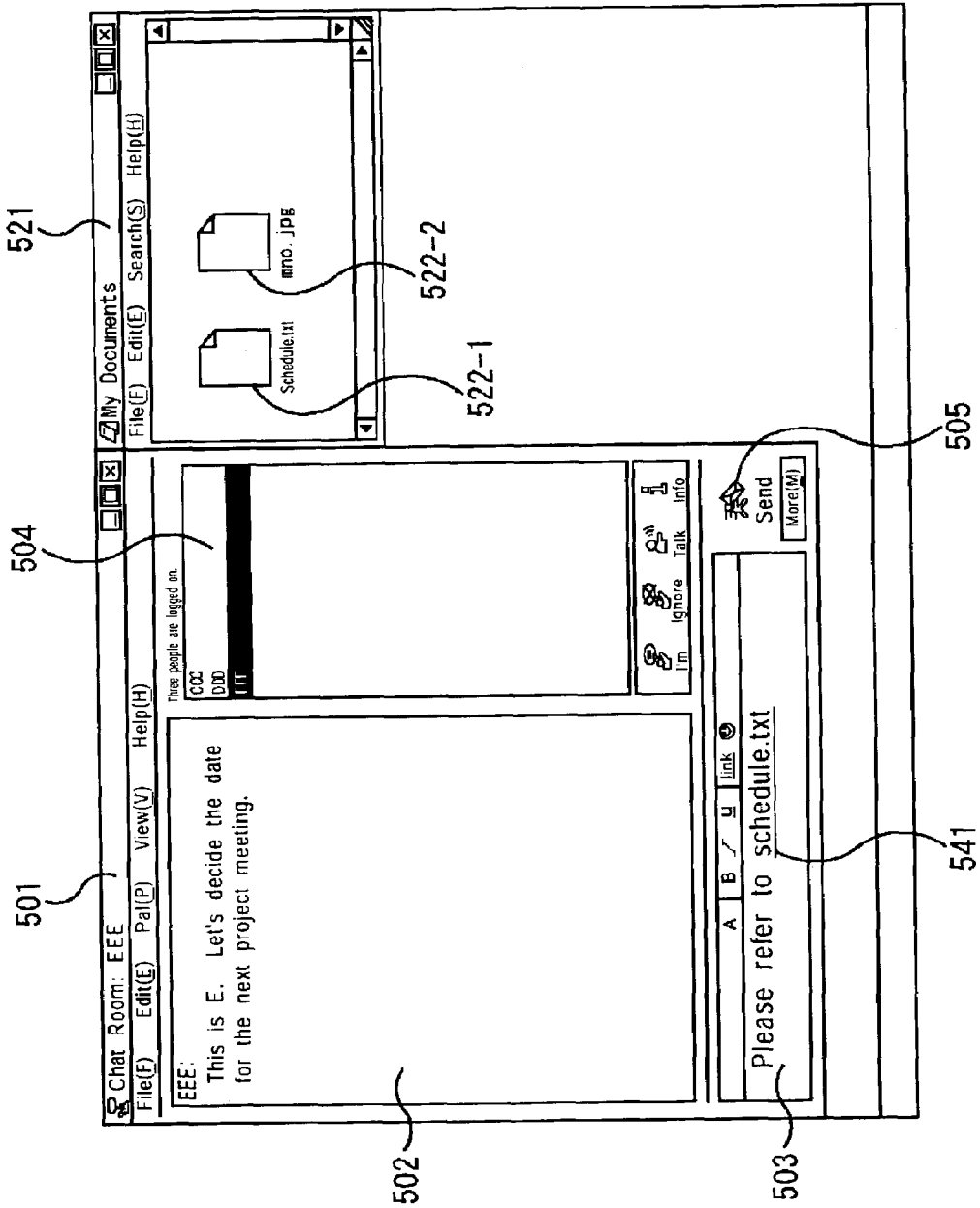
FIG. 26 is an illustration of an example of a screen displayed on the monitor of the client computer subsequent to the screen shown in FIG. 25 in step S332 in FIG. 24.

At this time, however, a character string that reads "for dates I'm available", subsequent to the link indication 541 of the input area 503 shown in FIG. 26, is not displayed. In FIG. 26, the same parts as those in FIG. 25 are designated by the same numerals and the functions thereof are the same, and thus descriptions thereof will be omitted.

As described above, when the user E drags and drops the file to the input area 503, the link indication 541 is displayed in the chat text, and a link is formed between the chat text and the file. As shown in FIG. 26, the file name of the file attached is displayed as the link indication 541 at first; however, the user is allowed to change the characters of the link indication 541 by performing a predetermined operation via the input unit 106. As shown in FIG. 26, the link indication 541 is underlined, and displayed in a color different from that of the other part of the chat text.

The user further inputs a character string that reads "for dates I'm available", as shown in the input area 503 in FIG. 26, and clicks on the send key 505 by the mouse (the input unit 106). Then, the CPU 101 of the client computer 15-5 determines that sending of the chat text being input in the input area 503 is instructed, and the procedure proceeds to step S333.

In step S333, the CPU 101 of the client computer 15-5 sends the chat text input in the input area 503 shown in FIG. 26, and a file that has been linked to the chat text (a file designated for attachment) to the chat server 13 via the communication unit 110.

In step S301, the communication unit 210 of the chat server 13 receives the chat text and the attachment file sent from the client computer 15-5 in step S333. In step S302, according to an instruction from the CPU 201 (FIG. 5) of the chat server 13, the chat room manager 41 stores the chat text received in step S301 as chat log data in the chat log data management area in the chat database 42, and stores the attachment file in the attachment file management area.

In step S303, according to an instruction from the CPU 201, the chat room manager 41 of the chat server 13 sends the chat log data and the attachment file stored in the chat database 42 in step S302 to the client computers 15-3 to 15-5 via the communication unit 210.

In step S311, the communication unit 110 of the client computer 15-3 receives the chat log data and the attachment file sent from the chat server 13 in step S303, and the CPU 101 of the client computer 15-3 stores the received chat log data and the attachment file in the storage unit 109.

Figure 27:
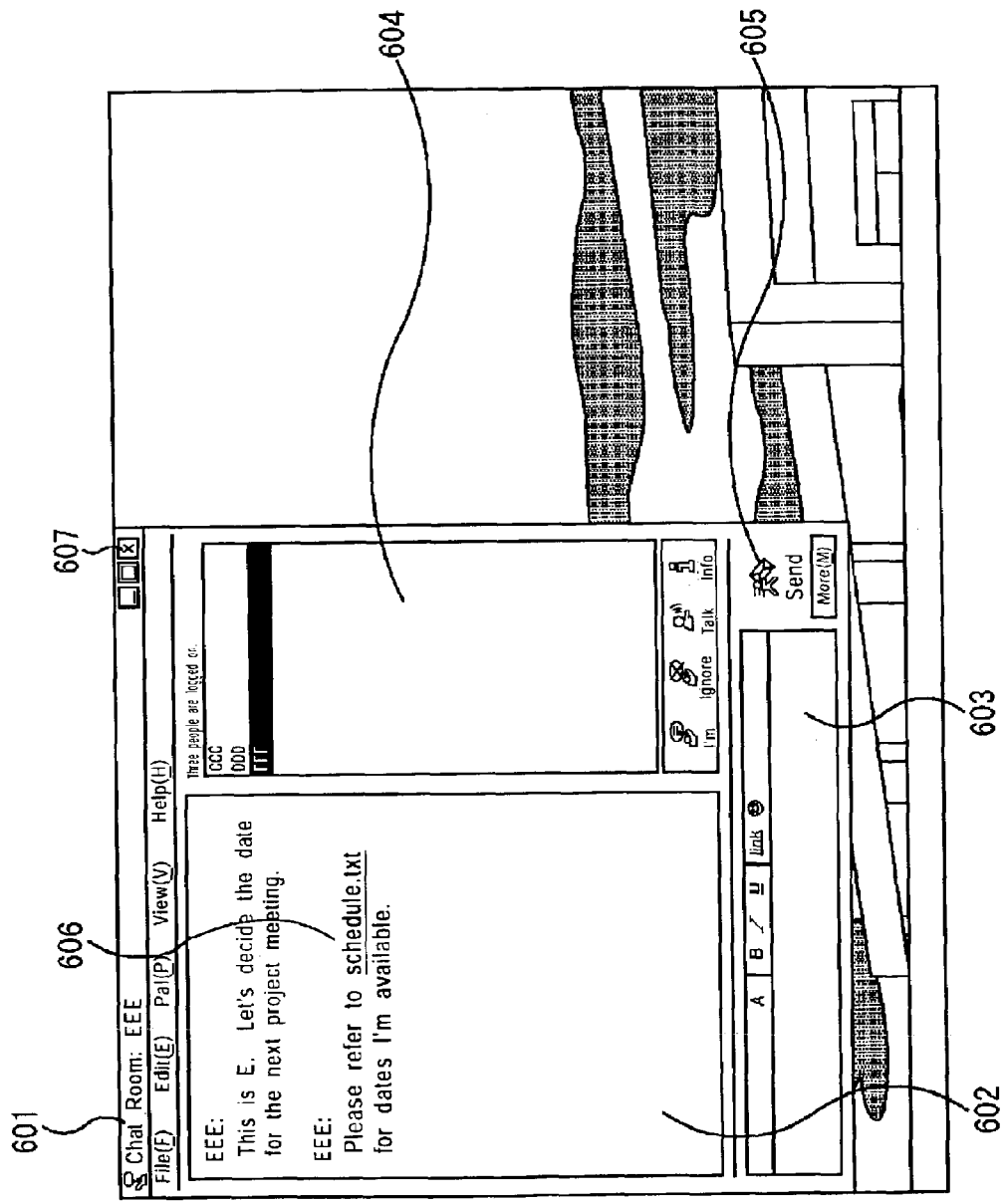
FIG. 27 is an illustration of an example of a screen displayed on the monitor of the client computer in step S312 in FIG. 24.

In step S312, the CPU 101 of the client computer 15-3 displays the chat log data stored in the storage unit 109 in step S311 on the monitor 108, as shown in FIG. 27.

FIG. 27 shows an example of a screen displayed on the monitor 108 of the client computer 15-3 in step S312, in which a chat window 601 is displayed on the right side of the monitor 108. Similarly to the chat window 501 on the monitor 108 of the client computer 15-5, shown in FIG. 23, the chat window 601 includes a log display area 602, an input area 603, a user list display area 604, and a send key 605. The functions of these parts are the same as those of the corresponding parts in the chat window 501 shown in FIG. 23, and thus descriptions thereof will be omitted.

Referring to FIG. 27, in the log display area 602, the chat log data that reads "This is E. Let's decide the date for the next project meeting.", input by the user E via the client computer 15-5, and the chat log data that reads "Please refer to schedule.txt for dates I'm available." are displayed.

The latter chat log data that reads "Please refer to schedule.txt for dates I'm available." is the chat log data sent from the client computer 15-5 in step S333, and is the same as the chat text that reads "Please refer to schedule.txt for dates I'm available." input in the input area 503 shown in FIG. 26. The chat log data includes a link indication 606, which is underlined and displayed in a color different from that of the other part of the chat log data.

Figure 28:
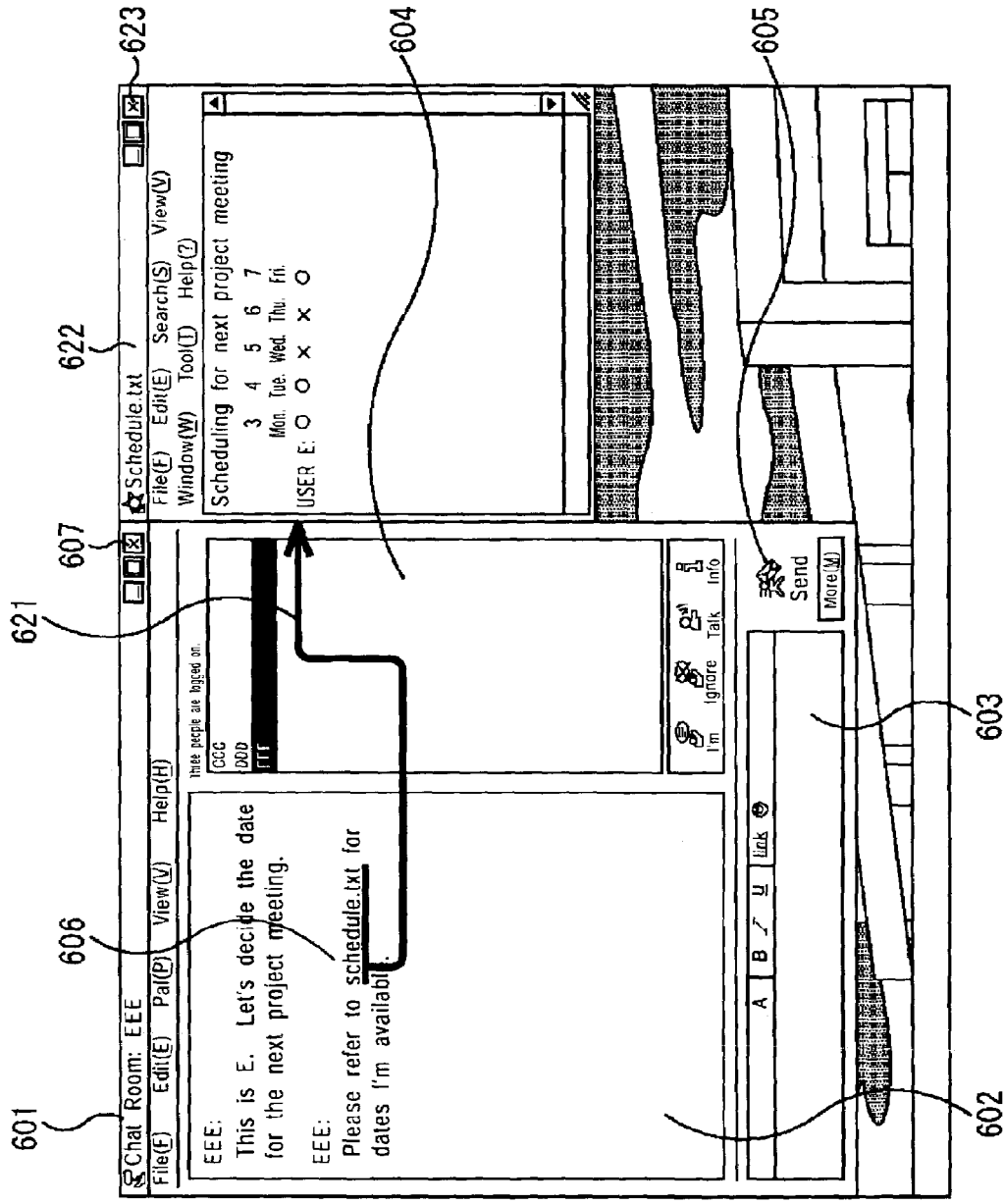
FIG. 28 is an illustration of an example of a screen displayed on the monitor of the client computer subsequent to the screen shown in FIG. 27 in step S312 in FIG. 24.

If the link indication 606 is clicked on by an operation of the mouse (the input unit 106) by the user C while the screen shown in FIG. 27 is in display on the monitor 108 of the client computer 15-3, the CPU 101 of the client computer 15-3 determines that an instruction for displaying the link indication 606 and the linked attachment file has been input, and displays a screen shown in FIG. 28 on the monitor 108.

FIG. 28 shows an example of a screen displayed on the monitor 108 of the client computer 15-3 when the link indication 606 is clicked on by the mouse.

Referring to FIG. 28 an attachment file displaying window 622 is displayed on the right side of the screen, and the content of the attachment file is displayed in the attachment file displaying window 622. Furthermore, a link arrow 621 directed from the link indication 606 to the linked attachment file displaying window 622 is displayed.

The CPU 101 of the client computer 15-3 displays the attachment file displaying window 622 on the monitor 108 and the attachment file therein, and also displays the link arrow 621 directed from the link indication 606 to the attachment file displaying window 622 on the monitor 108.

Thus, the user C of the client computer 15-3 is allowed to view the attachment file sent from the user E. Furthermore, the user C is allowed to readily grasp the association between the link indication 606 included in the chat log data and the attachment file displaying window 622.

Figure 24:
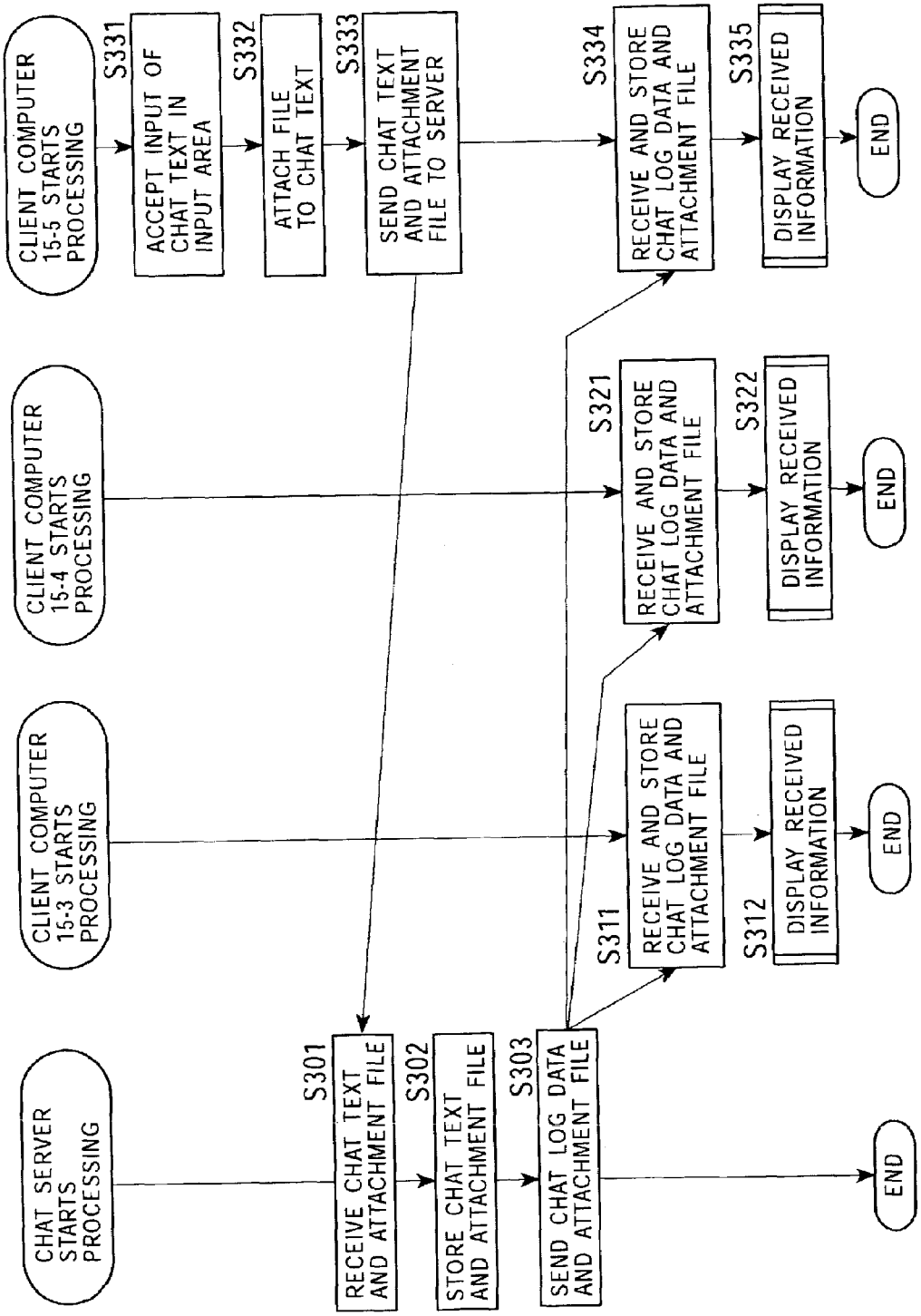
FIG. 24 is a flowchart of processing for the chat in the service providing system shown in FIG. 1.

In step S321 in FIG. 24, the communication unit 110 of the client computer 15-4 receives the chat log data and the attachment file sent from the chat server 13 in step S303, and the CPU 101 of the client computer 15-4 stores the received chat log data and attachment file in the storage unit 109.

In step S322, the CPU 101 of the client computer 15-4 displays the chat log data stored in the storage unit 109 in step S321 on the monitor 108. At this time, the screen displayed on the monitor 108 of the client computer 15-4 is basically the same as the screen on the monitor 108 of the client computer 15-3 shown in FIGS. 27 and 28.

In step S334, the communication unit 110 of the client computer 15-5, which has sent the chat text and the attachment file, receives the chat log data and the attachment file sent by the chat server 13 in step S303, and the CPU 101 of the client computer 15-5 stores the received chat log data and attachment file in the storage unit 109.

In step S335, the CPU 101 of the client computer 15-5 displays the chat log data stored in the storage unit 109 in step S334 on the monitor 108.

Figure 29:
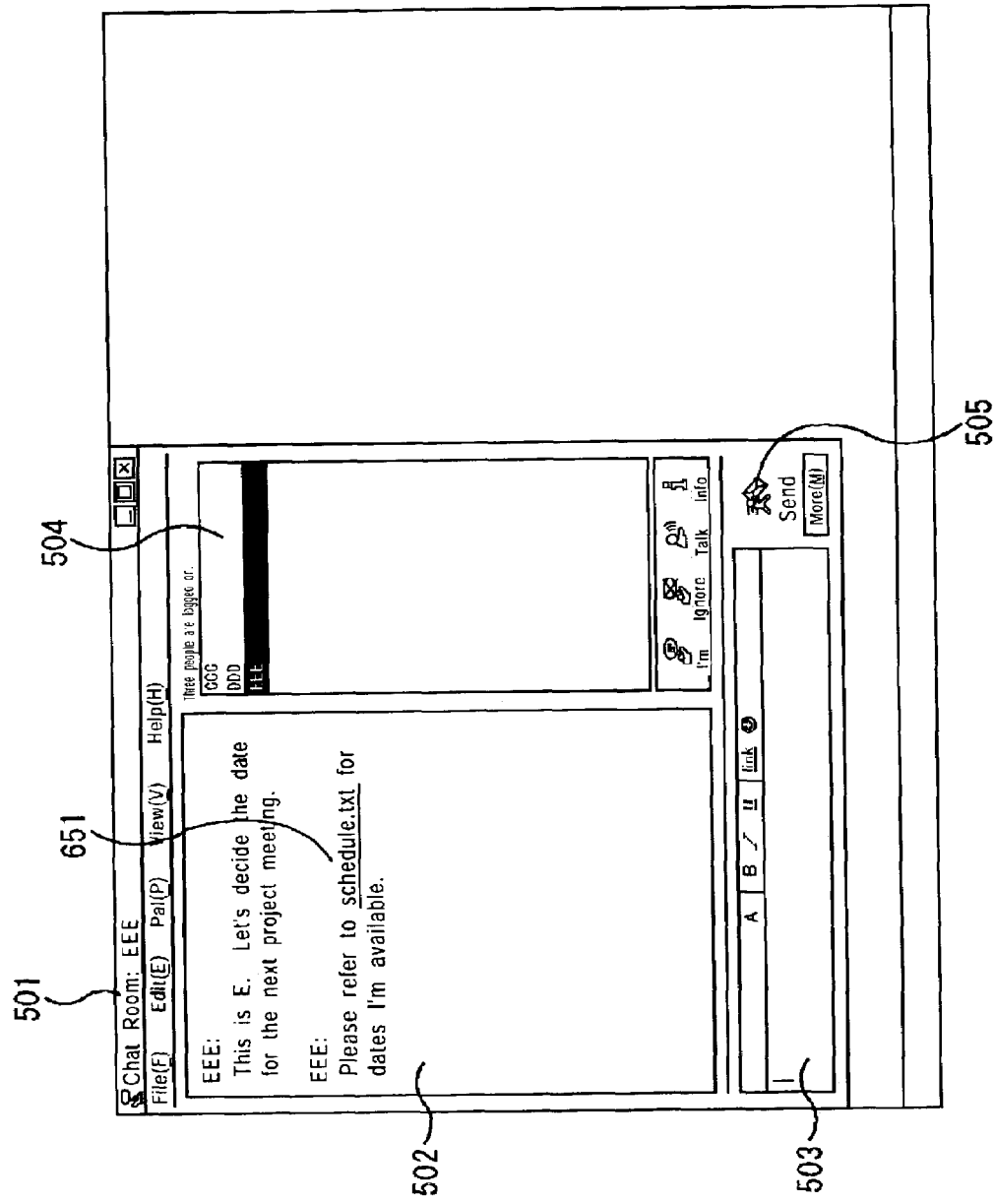
FIG. 29 is an illustration of an example of a screen displayed on the monitor of the client computer in step S335 in FIG. 24.

FIG. 29 shows an example of a screen displayed on the monitor 108 of the client computer 15-5 in step S335. In FIG. 29, the same parts as those in FIGS. 23, 25, and 26 are designated by the same numerals and have the same functions.

Referring to FIG. 29, in the log display area 502, below the chat log data that reads "This is E. Let's decide the date for the next project meeting.", which has already been displayed in the screen shown in FIG. 23, new chat log data that reads "Please refer to schedule.txt for dates I'm available" is displayed.

This chat log data includes a link indication 651 that reads "schedule.txt", which is underlined and displayed in a color different from that of the other part of the chat log data.

Figure 30:
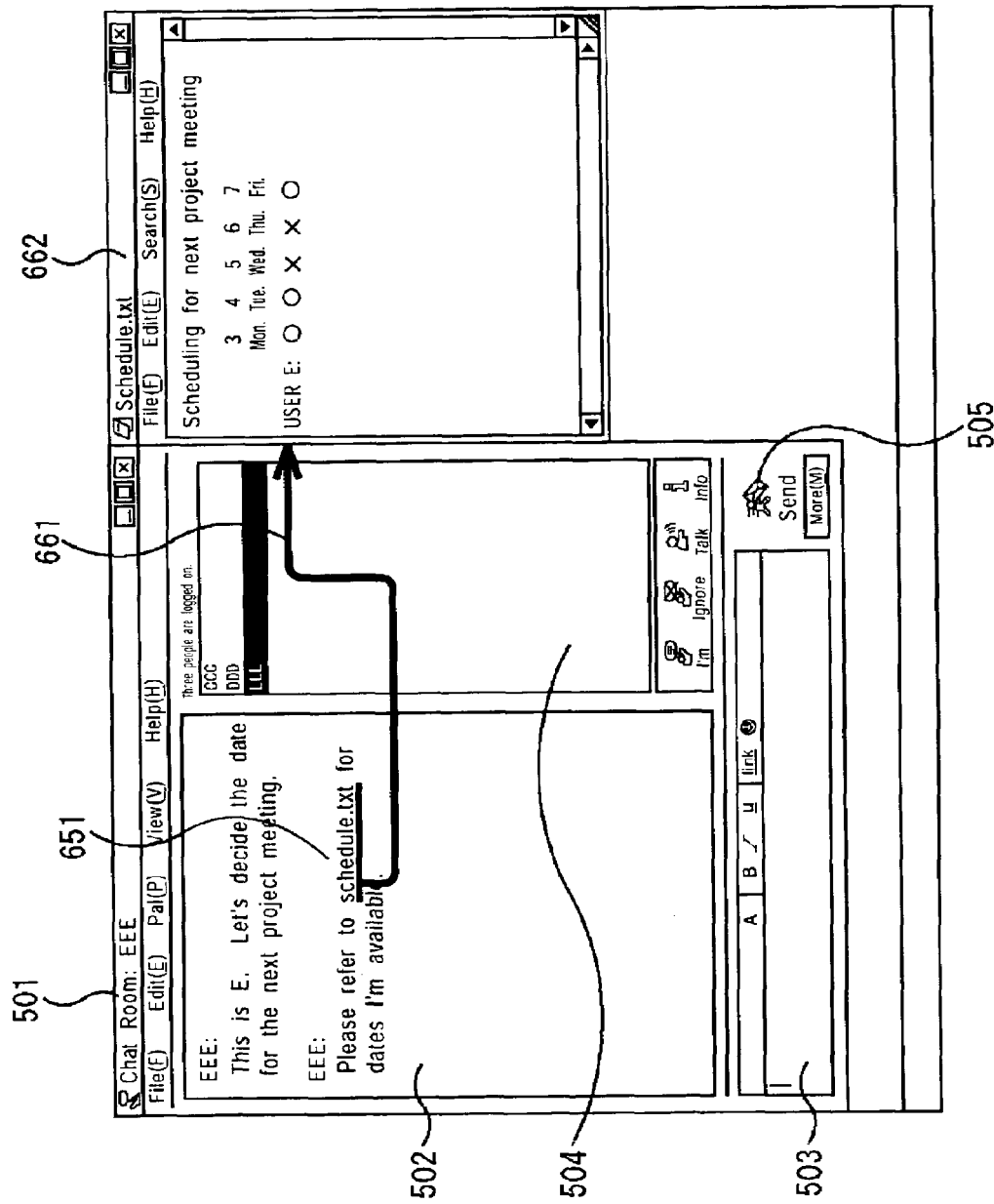
FIG. 30 is an illustration of an example of a screen displayed on the monitor of the client computer subsequent to the screen shown in FIG. 29 in step S335 in FIG. 24.

If the link indication 651 is clicked on by an operation of the mouse by the user E while the screen shown in FIG. 29 is in display on the monitor 108 of the client computer 15-5, the CPU 101 of the client computer 15-5 determines that an instruction for displaying the attachment file linked to the link indication 651 has been input, and displays an attachment file displaying window 662 on the monitor 108 and information of the attachment file therein, as shown in FIG. 30. Furthermore, the CPU 101 of the client computer 15-5 displays a link arrow 661 directed from the link indication 651 to the attachment file displaying window 662.

As described above, in the example of chatting according to the present invention, a file can be attached to a chat text and a link can be formed between the chat text and the attachment file. A client computer that has received chat log data displays a link indication together with the chat log data in a log display area on a monitor, and when the link indication is clicked on, it displays the linked attachment file. Accordingly, a user is allowed to share the file with other users by a simple operation while chatting.

In FIG. 24, steps S311, S321, and S334 involves basically the same processing. Also, in FIG. 24, steps S312, S322, and S335 involve basically the same processing.

Figure 31:
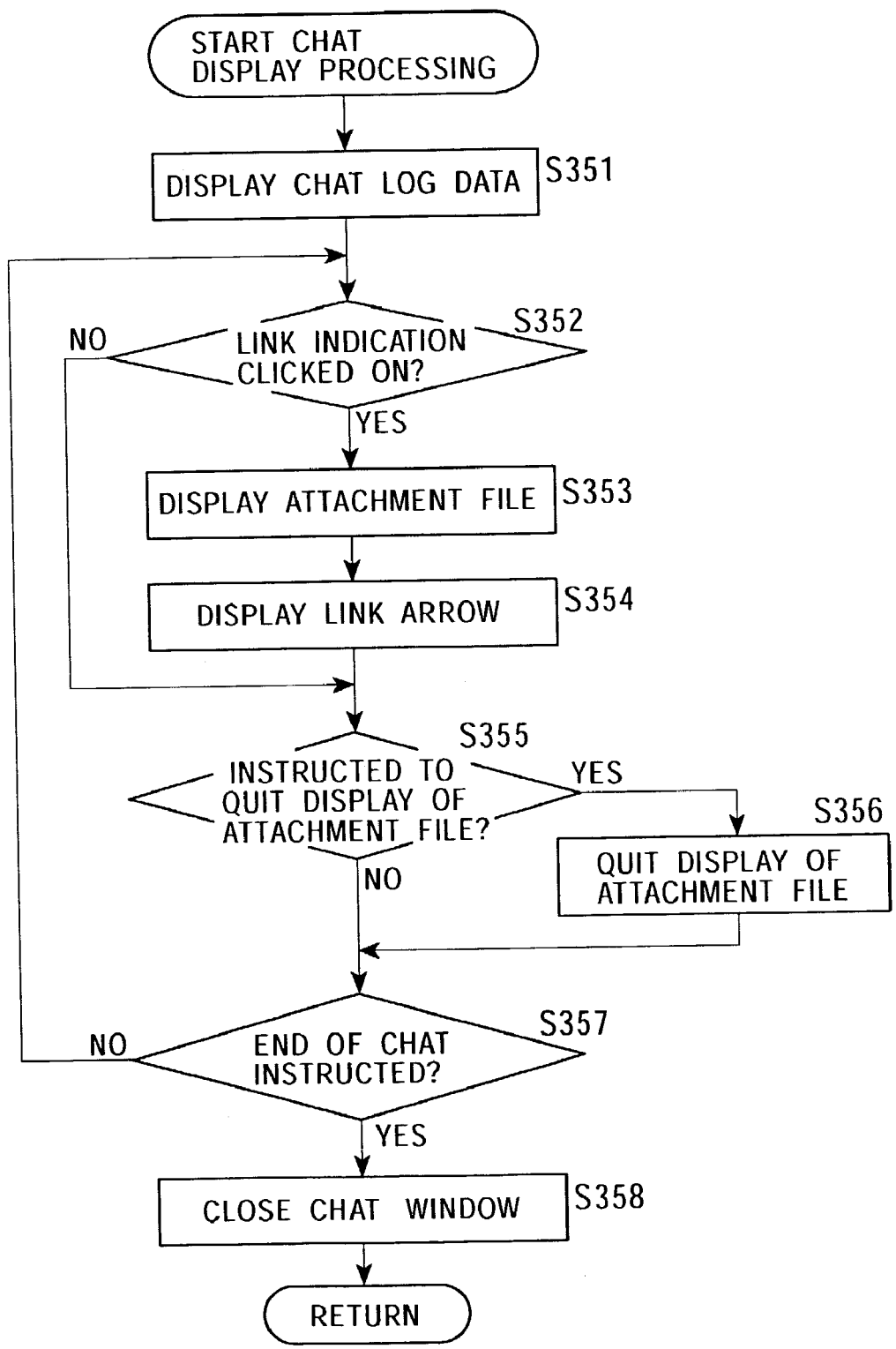
FIG. 31 is a detailed flowchart of processing in step S312 in FIG. 24.

Next, the processing in step S312 in FIG. 24 will be described in detail with reference to a flowchart shown in FIG. 31. The processing in steps S322 and S335 are the same as that in step S312.

In step S351, the CPU 101 of the client computer 15-3 displays the chat log data received in step S311 in FIG. 24 in the log display area 602 on the monitor 108 of the client computer 15-3, as shown in FIG. 27.

In step S352, the CPU 101 of the client computer 15-3 determines whether the link indication 606 shown in FIG. 27 has been clicked on by the mouse (the input unit 106). If the link indication 606 has been clicked on, the procedure proceeds to step S353, in which the CPU 101 of the client computer 15-3 displays the attachment file displaying window 622 on the monitor 108 and the attachment file in the attachment file displaying window 622, as shown in FIG. 28.

Upon the attachment file being displayed on the monitor 108 of the client computer 15-3 in step S353, the procedure proceeds to step S354, in which the CPU 101 of the client computer 15-3 displays the link arrow 621 shown in FIG. 28 on the monitor 108.

Accordingly, the user is allowed to readily grasp the association between the link indication 606 in the chat log data and the attachment file displaying window 622.

The procedure then proceeds to step S355.

If the CPU 101 of the client computer 15-3 determines in step S352 that the link indication 606 has not been clicked on, the procedure skips steps S353 and S354 and proceeds to step S355.

In step S355, the CPU 101 of the client computer 15-3 determines whether a button 623 at the top right corner of the attachment file displaying window 622 shown in FIG. 28 has been clicked on by the mouse (the input unit 106) to determine whether an instruction for quitting display of the attachment file has been input. If the button 623 has been clicked on, the procedure proceeds to step S356, in which the CPU 101 of the client computer 15-3 quits display of the attachment file display window 622, returning to the screen shown in FIG. 27. The procedure then proceeds to step S357.

If the CPU 101 of the client computer 15-3 determines in step S355 that the button 623 has not been clicked on, the procedure proceeds to step S357.

In step S357, the CPU 101 of the client computer 15-3 determines whether a button 607 at the top right corner of the chat window 601 in the screen shown in FIG. 27 or FIG. 28 has been clicked on by the mouse (the input unit 106) to determine whether an instruction for exiting the chat has been input. If the button 607 has not been clicked on, the procedure returns to step S352, and the processing in and subsequent to step S352 is repeated.

If the CPU 101 of the client computer 15-3 determines in step S357 that the button 607 has been clicked on, the procedure proceeds to step S358. In step S358, the CPU 101 of the client computer 15-3 quits display of the chat window 601 in the screen shown in FIG. 27 or FIG. 28, and the processing in the flowchart of FIG. 31 is exited.

As described above, the user C of the client computer 15-3 displays the chat log data sent from the client computer 15-5, and if the link indication in the chat log data is clicked on, it also displays the attachment file indicated by the link indication in the attachment file displaying window 622. Accordingly, the same file is shared between the user C and the user E. The same applies to the client computer 15-4.

The attachment file can be displayed by, for example, a display program included in mailing software, or other programs installed on the client computer 15 (including a word processing program, a spreadsheet program, and an image processing program).

In the embodiments described above, in which the present invention is applied to an e-mail and to a chat, a file attached to an e-mail or to a chat text has been described as an image file or a text file. However, any type of file that can be displayed on the monitor 108 of the client computer 15 may be attached. Furthermore, for example, audio data may be attached as a file. In that case, a receiver of the e-mail clicks on a link indication in a body of the e-mail to hear output of the audio data of the attachment file via the audio output unit 107.

The processing steps described above may be executed either by hardware or by software. If the processing steps are executed by software, a program constituting the software is installed on a computer embedded in dedicated hardware, or, for example, on a general-purpose computer that is capable of executing various functions with various programs installed thereon, via a network or from a recording medium.

The recording medium may be a package media having recorded thereon a program to be distributed to a user separately from an apparatus, such as the magnetic disk (including a flexible disk) 112, 141, 181, or 212, the optical disk (including a CD-ROM (compact disk read-only memory) and a DVD (digital versatile disk)) 113, 142, 182, or 213, the magneto-optical disk (including an MD (mini-disk)) 114, 143, 183, or 214, or the semiconductor memory 115, 144, 184, or 215. Alternatively, the recording medium may be the ROM 102, 132, 172, or 202, or a hard disk included in the storage unit 109, 138, 178, or 209, which is provided to the user as embedded in an apparatus.

The steps of the program recorded on the recording medium need not necessarily be executed sequentially in the order described in this specification, and may be executed in parallel or individually.

In this specification, a system refers to the entirety of a plurality of apparatuses.

What is claimed is:

1. A service providing system, comprising:
   an information providing apparatus for sending first information and a plurality of second information to an information processing apparatus, the plurality of second information being attached to the first information and different from the first information; and
   the information processing apparatus for presenting the first information and the second information received from the information providing apparatus;
   wherein the information providing apparatus comprises:
   sending means for sending (1) the first information, the first information including a chat log including chat text and a plurality of links respectively associated with the plurality of second information, the links being embedded at user selected positions within the chat text, and (2) the plurality of second information, to the information processing apparatus, and
   means for selecting the plurality of second information for which the plurality of links are included in the chat text, and
   the information processing apparatus comprises:
   receiving means for receiving the first information and the second information from the information providing apparatus; and
   presenting means for presenting the first information received by the receiving means as chat log data in a chat window, and for presenting the second information if one of the links included in the chat text presented is operated,
   wherein the presenting means displays an arrow directed from the one of the links to the second information when presenting the second information if the one of the links is operated.

2. An information providing apparatus for sending first information and a plurality of second information to an information processing apparatus, the plurality of second information being attached to the first information and different from the first information, the information providing apparatus comprising:
   receiving means for receiving the first information and the plurality of second information from the information processing apparatus;
   storage means for storing the first information and the plurality of second information received by the receiving means; and
   sending means for sending automatically (1) the first information, the first information including a chat log including chat text and a plurality of links respectively associated with the plurality of second information, the links being embedded at user selected positions within the chat text information, and (2) the plurality of second information, to the information processing apparatus and to all other information processing apparatuses participating in a chat session with the information processing apparatus.

3. An information providing method of an information providing apparatus for sending first information and a plurality of second information to an information processing apparatus, the plurality of second information being attached to the first information and different from the first information, the information providing method comprising:
   receiving the first information and the plurality of second information from the information processing apparatus;
   storing the first information and the plurality of second information received in the receiving step; and
   a sending step of sending automatically (1) the first information, the first information including a chat log including chat text and a plurality of links respectively associated with the plurality of second information, the links being embedded at user selected positions within the chat text and (2) the plurality of second information, to the information processing apparatus and to all other information processing apparatuses participating in a chat session with the information processing apparatus.

4. A computer program product embedded on a computer readable medium, the computer program product configured to cause a computer that controls an information providing apparatus for sending first information and a plurality of second information to an information processing apparatus, the plurality of second information being attached to the first information and different from the first information, to execute:
   receiving the first information and the plurality of second information from the information processing apparatus;
   storing the first information and the plurality of second information received in the receiving step; and
   a sending step of sending automatically (1) the first information, the first information including a chat log including chat text and a plurality of links respectively associated with the plurality of second information, the links being embedded at user selected positions within the chat text, and (2) the plurality of second information, to the information processing apparatus and to all other information processing apparatuses participating in a chat session with the information processing apparatus.

5. An information processing apparatus for presenting first information and second information received from an information providing apparatus, the second information being attached to the first information and different from the first information, the information processing apparatus comprising:
   receiving means for receiving the first information, including a link to the second information, and the second information from the information providing apparatus; and
   presenting means for presenting the first information received by the receiving means, and for presenting the second information if the link included in the first information presented is operated,
   wherein the presenting means displays an arrow directed from the link to the second information when presenting the second information if the link is operated.

6. An information processing apparatus according to claim 5, further comprising:
   first accepting means for accepting creation of the first information and the second information; and
   sending means for sending the first information and the second information, creation of which has been accepted by the first accepting means, to the information providing apparatus.

7. An information processing apparatus according to claim 6, wherein the first information includes a text.

8. An information processing apparatus according to claim 7, wherein the first accepting means displays an area for accepting input of the text, and creates the link associated with the second information at an end of the text being input to the area if an icon of the second information is dragged and dropped to the area displayed.

9. An information processing apparatus according to claim 8, further comprising second accepting means for accepting an instruction for attaching one or more sets of the second information, wherein the first accepting means creates, in response a predetermined operation by a user, the link to the second information, the instruction for attachment thereof having been accepted by the second accepting means, at an end of the text being input to the area.

10. An information processing method of an information processing apparatus for presenting first information and second information received from an information providing apparatus, the second information being attached to the first information and different from the first information, the information processing method comprising:
   a receiving step of receiving the first information, including a link to the second information, and the second information from the information providing apparatus; and
   a presenting step of presenting the first information received in the receiving step, and presenting the second information if the link included in the first information presented is operated,
   wherein the presenting step displays an arrow directed from the link to the second information when presenting the second information if the link is operated.

11. A computer program product embedded on a computer readable medium, the computer program product configured to cause a computer that controls an information processing apparatus for presenting first information and second information received from an information providing apparatus, the second information being attached to the first information and different from the first information, to execute:
   a receiving step of receiving the first information, including a link to the second information, and the second information from the information providing apparatus; and
   a presenting step of presenting the first information received in the receiving step, and presenting the second information if the link included in the first information presented is operated,
   wherein the presenting step displays an arrow directed from the link to the second information when presenting the second information if the link is operated.

* * * * *